United States Patent
Blank et al.

(10) Patent No.: US 8,554,670 B1
(45) Date of Patent: Oct. 8, 2013

(54) SYSTEMS AND METHODS FOR CREDITING MISSED LOCATION-BASED ELECTRONIC CHECK-INS IN A SOCIAL NETWORK

(75) Inventors: Bennett R. Blank, San Diego, CA (US); Jonathan A. Lieberman, San Diego, CA (US); Saied Moezzi, Carlsbad, CA (US); Ronald J. Char, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 303 days.

(21) Appl. No.: 12/819,070

(22) Filed: Jun. 18, 2010

(51) Int. Cl.
*G06Q 40/00* (2012.01)

(52) U.S. Cl.
USPC ........... 705/39; 705/14.49; 705/42; 705/26.1; 705/1.1

(58) Field of Classification Search
USPC ................ 705/1.1, 39, 14.49, 42, 14.16, 319, 705/26.1, 35; 709/224; 455/456.1
See application file for complete search history.

(56) References Cited

U.S. PATENT DOCUMENTS

2011/0196724 A1* 8/2011 Fenton et al. .............. 705/14.16
2011/0307307 A1* 12/2011 Benmbarek ................. 705/14.4

OTHER PUBLICATIONS http://blog.foursquare.com/post/503822143/on-foursquare-cheating-and-claiming-mayorsh . . . "On foursquare, cheating, and claiming mayorships from your couch . . . "; Aug. 26, 2010.* www.foursquare.com printed Aug. 26, 2010 (11 pages).
http://gowalla.com/ printed Aug. 26, 2010 ( 6 pages).
http://blog.foursquare.com/post/503822143/on-foursquare-cheating-and-claiming-mayorships-from Blog "On foursquare, cheating, and claiming mayorships from your couch . . . " printed Aug. 26, 2010 (1 page).
http://www.businessinsider.com/how-hit-location-based-social-app-foursquare-works-2010-1 "What Is Foursquare and How do I Use It" printed Aug. 26, 2010 (9 pages).

* cited by examiner

*Primary Examiner* — John H Holly
(74) *Attorney, Agent, or Firm* — Vista IP Law Group LLP

(57) ABSTRACT

Identifying missed electronic check-ins and crediting missed check-ins to members of a social network by utilizing transaction data from an intermediate computer other than a computer of the social network. Missed check-ins are identified using transaction data resulting from an activity of the member at a check-in location, e.g., when the member purchased an item from a merchant at a check-in location or made a call from the location. Transaction data is sent from a computer that stores the data to the social network computer that manages check-ins. Transaction location is compared with check-in locations to determine whether the member should receive credit for the missed check-in, which may count towards rewards or benefits of the social network even though the member is not currently at the check-in location since the missed check-in is validated by a trusted source of transaction data.

30 Claims, 24 Drawing Sheets

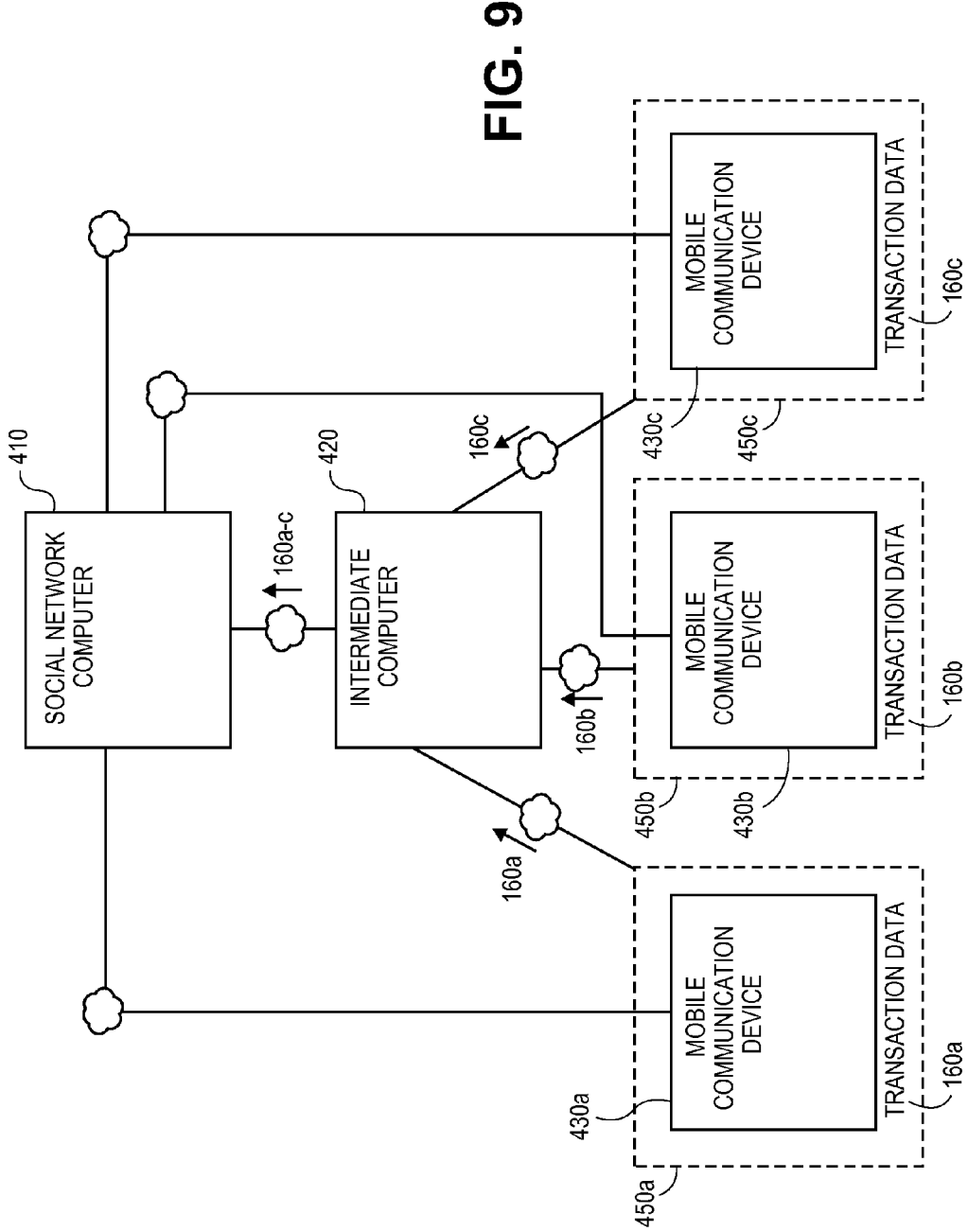

| Member Identification | Transaction Date / Time | Electric Receipt Data |
|---|---|---|
| Member ID 1 | Date / Time 1 | Receipt Data 1 |
| Member ID 2 | Date / Time 2 | Receipt Data 2 |
| Member ID 3 | Date / Time 3 | Receipt Data 3 |

SYSTEMS AND METHODS FOR CREDITING MISSED LOCATION-BASED ELECTRONIC CHECK-INS IN A SOCIAL NETWORK

BACKGROUND

The invention is related to social networks. Social networks are becoming increasing popular as more people become more connected and utilize mobile communication devices and applications to participate in social networks and stay connected with friends, family and colleagues. In social networks such as FOURSQUARE on-line social networking service of Foursquare Labs., Inc. (foursquare.com) and GOWALLA on-line social networking service of Gowalla Inc. (gowalla.com), members or users (generally, "members" of the social network) visit various locations and utilize an application that executes on a mobile communication device to electronically check-in at the various locations recognized by the social network based on Global Positioning Service (GPS) location data of a mobile communication device such as a cellular telephone or Smartphone. FOURSQUARE is a registered trademark of Foursquare Labs, Inc., New York N.Y., and GOWALLA is a registered trademark of Gowalla, Inc., Austin, Tex.

For example, FIG. 1A illustrates how an application that is downloaded from a computer of FOURSQAURE on-line social networking service to a mobile communication device 10 (an iPhone in the illustrated example) is executed to generate a user interface 12 that is displayed on the screen 14 of the mobile communication device 10 and shows a location 16 of the mobile communication device 10 (Ogawa Café, 34 E. $4^{th}$ Street in the illustrated example). The location 16 is determined by the application according to GPS data of the iPhone. FIG. 1A also illustrates that the interface 12 shows members 18 of the social network that are or were electronically checked in at the same location.

Thus, these electronic check-ins are location-based such that a member can check-in at a particular location when the mobile communication device GPS data indicates that the mobile communication device 12 is at that same location. For this purpose, as shown in FIG. 1A, the interface 12 includes a "CHECK-IN HERE" button 20 that can be selected by the member when the member is at a location to electronically check-in at that location. When the member checks in at a location, data such as the location and check-in time may be sent from the mobile communication device 10 to a computer of an on-line social networking service such as that provided by Foursqaure Labs., Inc., which manages location-based check-ins for its members. The social network computer may verify the check-in data and credits the check-in to the member if the location determined by the GPS data of the mobile communication device 10 matches a check-in location of the on-line social networking service or, in the illustrated example, if the mobile communication device is at GPS coordinates that match or are within a set of coordinates of Ogawa Café as determined by check-in data of the on-line social networking service. Further, such systems may augment GPS data with other location determination systems such as cell tower triangulation, WiFi triangulation and other data sources. These other systems may also be built into the operation system and hardware of a mobile communication device for determining location.

Location-based electronic check-ins can be utilized for various purposes. For example, checking into a location with a mobile communication device 10 includes a social aspect of the service by informing other members within the social network where you currently are and where you have been. Member check-ins can also be broadcast to other social network services or websites such as FACEBOOK, TWITTER, etc. on-line social networking services such that members of those social networks can also be informed of the member's current and prior check-in locations, thereby allowing friends, family and other members of the social network to join or meet the member. FACEBOOK is a registered trademark of Facebook, Inc., Menlo Park, Calif., and TWITTER is a registered trademark of Twitter, Inc., San Francisco, Calif.

In addition to the social aspect of electronic check-ins, there is a competitive or gaming aspect. For example, in FOURSQUARE on-line social networking service, a member can be appointed as the "mayor," which may be based on the number of visits or electronic check-ins of the member at that location or a number of check-ins during a certain period of time. For example, as shown in FIG. 1A, one of the members who is currently checked in at Ogawa Café is also the mayor 22 of Ogawa Café. Being the mayor may entitle that member to certain benefits such as coupons, gift cards or free items from that particular merchant.

Further, as shown in FIG. 1B, members may also receive or be awarded badges, awards, points or other merit elements 24. For example, members of the FOURSQUARE on-line social networking service may visit a certain check-in location a certain number of times or check-in a certain total number of times and be awarded certain badges that indicate how many check-ins have been achieved or a status or other information about the member. Further, a member may receive a discount, reward or incentive for loyalty to a particular merchant or location. For example, if a member checks into a coffee shop 10 times per week, the coffee shop may send the member a coupon for a free coffee for every 10 check-ins.

Given the manner in which electronic location-based check-ins can be used and what they represent, they are becoming a type of "behavioral currency" within social networks. As such, check-ins may also involve challenges of real currencies such as fraud, theft, etc. For example, food merchants often provide free or discounted menu items to members of the social network who check-in at the merchant location often, and fraudulent check-ins may thus be costly to merchants. Further, a member who fraudulently checks in at locations may be awarded benefits that would otherwise be awarded to other members. Further, there may be instances when members check-in to a valid location but are not credited with the check-in. Additionally, once a check-in is not registered, is stolen, or if the member forgets to check-in at a valid check-in location, those missed check-ins are not be recoverable or recoverable in limited situations and used for limited purposes. For example, certain networks such as the FOURSQUARE on-line social networking service permit members to pre-check-in and post-check-in before or after arriving at the check-in location. However, since benefits of the FOURSQUARE on-line social networking service are based on location-based electronic check-ins, post-check-ins, the FOURSQUARE on-line social networking service does not count post-check-ins towards rewards since rewards are based on check-ins sent from the actual check-in location.

These check-in restrictions have a number of possible negative effects that negatively impact the value or experience of social networks such as FOURSQUARE and GOWALLA on-line social networking services. It is not uncommon for a member to be at the actual check-in location but forget to check-in. Thus, the member may feel cheated as a result of not receiving credit for the check-in. Known systems may also lead to members checking in less frequently since check-ins in may be inconvenient and credit is not provided for missed check-ins. These shortcomings may ultimately turn the member off to such services since the member may feel that too much work is required to track all of the check-ins and that the member has lost too many valid check-ins.

SUMMARY

One embodiment is directed to a method for identifying a check-in missed by a member of a social network who utilizes a mobile communication device to electronically check-in at merchant locations and which involves the mobile communication device being in communication with a first computer of the social network through a first network. The method comprises the steps of receiving, at a first computer of the social network, transaction data resulting from the member purchasing an item from a merchant at which the member did not check in at the merchant location with the mobile communication device, thus missing the opportunity to check-in at the merchant location. The method further comprises. The transaction data being received from a second computer through a second network, the second computer storing respective transaction data of respective purchases of respective items by respective members of the social network from respective merchants. The method further comprises using at least one of the first and second computers to determine the merchant location from the received transaction data, compare the determined merchant location and a check-in location of the social network, and determine whether to credit the member with the missed check-in based at least in part upon the comparison.

Another embodiment is directed to a method for crediting a member of a social network, who utilizes a mobile communication device to electronically check-in at merchant locations, with a missed electronic check-in. The method comprises receiving, at the computer of the social network, transaction data, such as receipt data, related to a prior purchase of an item by the member from a merchant location comprising a check-in location. The check-in opportunity was missed since the member did not check in at the merchant location with the mobile communication device. The method further comprises retroactively crediting the member with a check-in based at least in part upon the received transaction data utilizing the first computing apparatus. Thus, even though the member did not check-in at the merchant location, the member is credited with the check-in at a later time, and since these check-ins are supported by transaction data, they may count towards rewards such as mayorships, points, badges, financial or loyalty rewards, etc.

A further embodiment is directed to a method for crediting a member of a social network who utilizes a mobile communication device to electronically check-in at merchant locations with a missed electronic check-in and comprises identifying the missed electronic check-in, and crediting the missed electronic check-in to the member after the member has left the location. Thus, even though the member did not check-in at the merchant location, the member is credited with the check-in at a later time after the member leaves the merchant location and is at another location. For example, the check-in credit may be applied to the member when the member is at home, at work, or at another check-in location, and since these check-ins are supported by transaction data, they may count towards rewards such as mayorships, points, badges, financial or loyalty rewards, etc.

Yet another embodiment is directed to a method for identifying a check-in missed by a member of a social network who utilizes a mobile communication device to electronically check-in at merchant locations and which involves the mobile communication device being in communication with a first computer of the social networking device through a first network. The method comprises the steps of receiving, at a first computing apparatus of the social network, a photograph taken utilizing the mobile communication device. The photograph comprises transaction data of a purchase of an item from the merchant by the member who did not utilize the mobile communication device to check-in at the merchant location. The method further comprises utilizing the first computing apparatus to determine a location of the merchant from the received photograph, compare the determined merchant location and a check-in location of the social network with the first computing apparatus, and determine whether to credit the member with the missed check-in based at least in part upon the comparison. Since these check-ins are supported by transaction data, they may count towards rewards such as mayorships, points, badges, financial or loyalty rewards, etc.

Yet a further embodiment is directed to a method for identifying a check-in missed by a member of a social network who could have utilized a mobile communication device to electronically check-in at a location of a merchant and comprises receiving, at a first computer of the social network, a phone record of a call made from the mobile communication device. The method further comprises utilizing the first computer to determine a location from which the call was made from the phone record, compare the location from which the call was made and a check-in location of the social network, and determine whether to credit the member with the missed check-in based at least in part upon the comparison. Since these check-ins are supported by transaction data in the form of a record of a phone call made at the check-in location (e.g., as determined by GPS, triangulation or another location determination method), they may count towards rewards such as mayorships, points, badges, financial or loyalty rewards, etc.

Another embodiment is directed to a method for identifying a check-in missed by a member of a social network who utilizes a mobile communication device to electronically check-in at merchant locations, and comprises receiving transaction data at a first computer, the transaction data being generated by a payment device of the merchant from whom the member purchased an item. The computer is in communication with a second computer of the social network through a first network. The method further comprises using at least one of the first and second computers, and transmitting transaction data from the first computer to the second computer as necessary, to determine a location of the merchant from the received transaction data, compare the determined merchant location and a check-in location of the social network, and determine whether to credit the member with the missed check-in based at least in part upon the comparison with at least one of the first and second computers.

An additional embodiment is directed to a method for crediting a member of a social network who utilizes a mobile communication device to electronically check-in at merchant locations with a missed electronic check-in and comprises receiving, at a first computer associated with a second computer of the social network utilizing electronic check-ins, transaction data related to a prior purchase of an item by the member from a merchant at a check-in location, and retroactively crediting the member with a check-in based at least in part upon the received transaction data utilizing at least one of the first and second computers.

Another embodiment is directed to a method for crediting a member of a social network who utilizes a mobile communication device to electronically check-in at merchant locations with a missed electronic check-in and comprises receiving, at a first computer associated with a second computer of the social network, transaction data related to a prior purchase of an item by the member from a merchant at a check-in location, and using at least one of the first and second computers to identify a missed electronic check-in based at least in part upon the received transaction data utilizing at least one of the first and second computers, and credit the missed electronic check-in to the member after the member has left the location utilizing at least one of the first and second computers.

A further embodiment is directed to a method identifying a check-in missed by a member of a social network who utilizes a mobile communication device to electronically check-in at merchant locations and which involves receiving transaction data from a source or intermediate computer other than the social network computer utilized to manage check-ins, and determining whether any check-ins have been missed based at least in part upon the check-in data received from the intermediate computer. The source may be a host of receipt or personal finance programs such as Intuit Inc. or another third party. The data from the source may be in the form of a photograph of a receipt, and the photograph may be transmitted to the social network computer from the mobile communication device utilized to take the photograph, from a computer of the member that was used to download the photograph from the mobile communication device or other camera, or from an intermediate or host computer that receives the photograph from the mobile communication device or member computer. The source may also be call data provided by a phone company. Thus, with embodiments, transaction data received from a source other than the social network is used to identify missed check-ins and credit those check-ins to the member.

Other embodiments are directed to systems for implementing method embodiments. For example, one embodiment of a system for identifying a check-in missed by a member of a social network who could have utilized a mobile communication device to electronically check-in at a location of a merchant comprises a first computer of the social network and a second computer that stores respective transaction data of respective purchases of respective items by respective members of the social network from respective merchants. The first computer is accessible by or in communication with the mobile communication device through a first network utilizing an application that executes on the mobile communication device. The second computer that stores transaction data is in communication with the first computer through a second network. The first computer of the social network may access or receive transaction data of the second computer such that at least one of the first and second computers is configured to access or receive transaction data of a purchase of an item from the merchant by a member who did not utilize the mobile communication device to check-in at the merchant location, determine a location of the merchant from the received transaction data, compare the determined merchant location and a check-in location of the check-in service, and determine whether to credit the member with the missed check-in based at least in part upon the comparison.

Other system embodiments involve the social networking computer being in communication with a mobile communication device to receive a photograph of transaction data, e.g., a photograph of a receipt, which shows that the member of the social network was at the merchant location but forgot to check-in at the merchant location. The photograph may be sent directly from the mobile communication device or first downloaded from the mobile communication device to a consumer computer, and then transmitted from the consumer computer to a computer used to determine whether a check-in credit is due.

Yet another system embodiment involves the social networking computer or the computer that collects and stores transaction or receipt data being in communication with a computer that stores phone records of the mobile communication device that is used by the member to electronically check-in at merchant locations. In these system embodiments, the phone call data can be provided to or accessed by one or both of the social networking and transaction data computers to determine whether the member placed a call while at a check-in location, and if so, the member may be credited with a check-in based on that information.

A further embodiment is directed to a computer program or computer program product, which may be in the form of an application that executes on a mobile communication device or computer program instructions on a tangible medium. The computer program or product comprises instructions that are readable by a computer to perform method steps of embodiments for identifying missed electronic check-in utilizing transaction data and crediting the member of the social network with the check-in even after the member leaves the check-in location.

According to a single or multiple embodiments, the transaction data comprises a photograph of a paper receipt generated when the member purchased the item from the merchant. The photograph can be transmitted to the computer of the social network utilized to manage check-ins of its members.

The transaction data may also comprises electronic transaction data, which is generated when the member purchases an item from a merchant at the merchant location, which is identified by the electronic receipt data. For example, a personal finance program such as QUICKEN, MINT and FINANCEWORKS personal finance programs, may be used to collect electronic transaction data from various accounts of the member, e.g., accounts such as a savings account, a checking account, a money market account, and a credit card account, which may be debited using a debit card, credit card or check, for example. QUICKEN, MINT and FINANCEWORKS are registered trademarks of Intuit Inc., Mountain View, Calif. These transactions are recorded in their respective accounts, and the personal finance program can acquire this information from the accounts, which may on-line accounts that are also accessible by the member or account holder.

Embodiments may also involve electronic transaction data in the form of receipt data. According to one embodiment, in addition electronic receipt data identifying a location of the merchant so that the a determination can be made whether the transaction occurred at a recognized check-in location, the receipt data may also include other data related to the transaction such as a merchant identifier, a transaction date, a transaction amount, an item identifier, and an identification of a form of payment tendered by the member to purchase the item from the merchant.

In a single or multiple embodiments, the computer that collects transaction data may host or access a receipt data collection program such as QUICKRECEIPTS personal finance program. QUICKRECEIPTS is a registered trademark of Intuit Inc., Mountain View, Calif. For this purpose, the computer is in communication with respective payment devices (e.g., Point Of Sale (POS) terminals) of respective merchants through respective networks. The receipt collection program such as QUICKRECEIPTS personal finance program executes to receive respective electronic receipt data for respective purchases of respective items by respective members of the social network. This data is stored in a database on or accessible by the transaction data computer. The determination whether to credit respective members with respective missed check-ins being based at least in part upon the respective electronic receipt data stored in the database.

After determining that a missed check-in will be credited, the member can be credited and notified, e.g., via an electronic message such as a text or e-mail message to the mobile communication device utilized for electronically checking into a location.

In one or more embodiments, the computer that collects and stores transaction data provides data or requested data to the computer utilized to analyze missed check-ins. Thus, in these embodiments, the social networking computer will perform all of the steps of determining the merchant location, comparing the determined merchant location and check-in locations of the social network, and automatically crediting the member with the missed check-in if the determined merchant location matches a check-in location. In other embodiments, the transaction data computer may perform certain steps, e.g., determining the merchant location, comparing the determined merchant location and check-in locations of the social network, and transmitting a message to the social networking computer with the result of the comparison. If the comparison results in a valid missed check-in, the social networking computer that manages the check-ins may then be used to automatically credit the member with the missed check-in based at least in part upon the message from the second computer.

In a single or multiple embodiments, the social network computer or the member may request that data be transferred to or accessed by the social network computer. Such access or retrieval may also occur periodically. Further, the consumer may accesses a personal finance program or receipt data collection program that is programmed to display a screen or interface including the transaction or receipt data and that includes an icon or object that can be selected by the member to initiate a request for a check-in that was missed at the location identified by the location or receipt data.

Thus, with embodiments, social networks such as FOURSQUARE and GOWALLA on-line social networking services may be utilized to electronically check-in at various locations such that members can be granted a mayorship, accolade, honor or reward (such as a free item or discount). Such honors or rewards can be based only on check-ins made by the member when the member was at the check-in location, only check-ins that missed by the member, or a combination thereof. Further, missed check-ins can be credited with or without the member's knowledge. For example, the member may request a credit for a missed check-in, or computers may communicate with each other and process missed check-ins automatically.

Further, with embodiments, check-ins that are retroactively credited or credited after the member has left the check-in location can count towards rewards such as mayorships, points, badges, financial or loyalty rewards, etc. since these check-ins are validated by transaction data showing that the member was at the check-in location on a certain date or at a certain time.

BRIEF DESCRIPTION OF THE DRAWINGS

The foregoing and other aspects of embodiments are described in further detail with reference to the accompanying drawings, wherein:

FIGS. 1A-B illustrate user interfaces of a known social network that allows members to electronically check-in at locations using a mobile communication device, wherein FIG. 1A illustrates a location of the mobile communication device and check-in button that can be selected by a member, and FIG. 1B illustrates various rewards or accolades that a member can earn based on location based electronic check-ins;

FIG. 6 generally illustrates comparison of location data determined from transaction data and valid check-in locations and comparisons with check-ins that have already been credited to determine whether the member is entitled to a credit for a missed check-in;

FIG. 9 illustrates a system constructed according to another embodiment for analyzing missed check-ins for multiple members of a social network;

FIGS. 10A-B generally illustrates how the system shown in FIG. 9 may be utilized to credit various members of the social network with their respective missed location-based electronic check-ins, wherein FIG. 10A illustrates check-ins before application of embodiments of the invention, and FIG. 10B illustrates missed check-ins credited to members as a result of embodiments;

FIG. 13 is a table generally illustrating types of data a receipt data program on the intermediate computer may collect;

FIGS. 14A-B illustrates an example of user interfaces that may be generated by a receipt data program, FIG. 14A illustrates discrete objects or icons representing receipts, and FIG. 14B illustrates more detailed electronic receipt data that may be displayed upon selecting a discrete object or icon;

DETAILED DESCRIPTION OF ILLUSTRATED EMBODIMENTS

Embodiments are related to methods and systems for proving or validating missed location-based check-ins. With embodiments, a member of a social networking service or website such as foursquare.com of Foursquare Labs., Inc. and gowalla.com of Gowalla Inc. can receive full credit for missed check-ins that may be applied to rewards as a result of verification or validation from a source of transaction data other than the social network. Thus, embodiments utilize an intermediate computer and transaction data to identify missed check-ins in such a manner that missed check-ins can count towards rewards, thus enhancing the value of social networks that utilize location-based electronic check-ins.

Figure 1A:
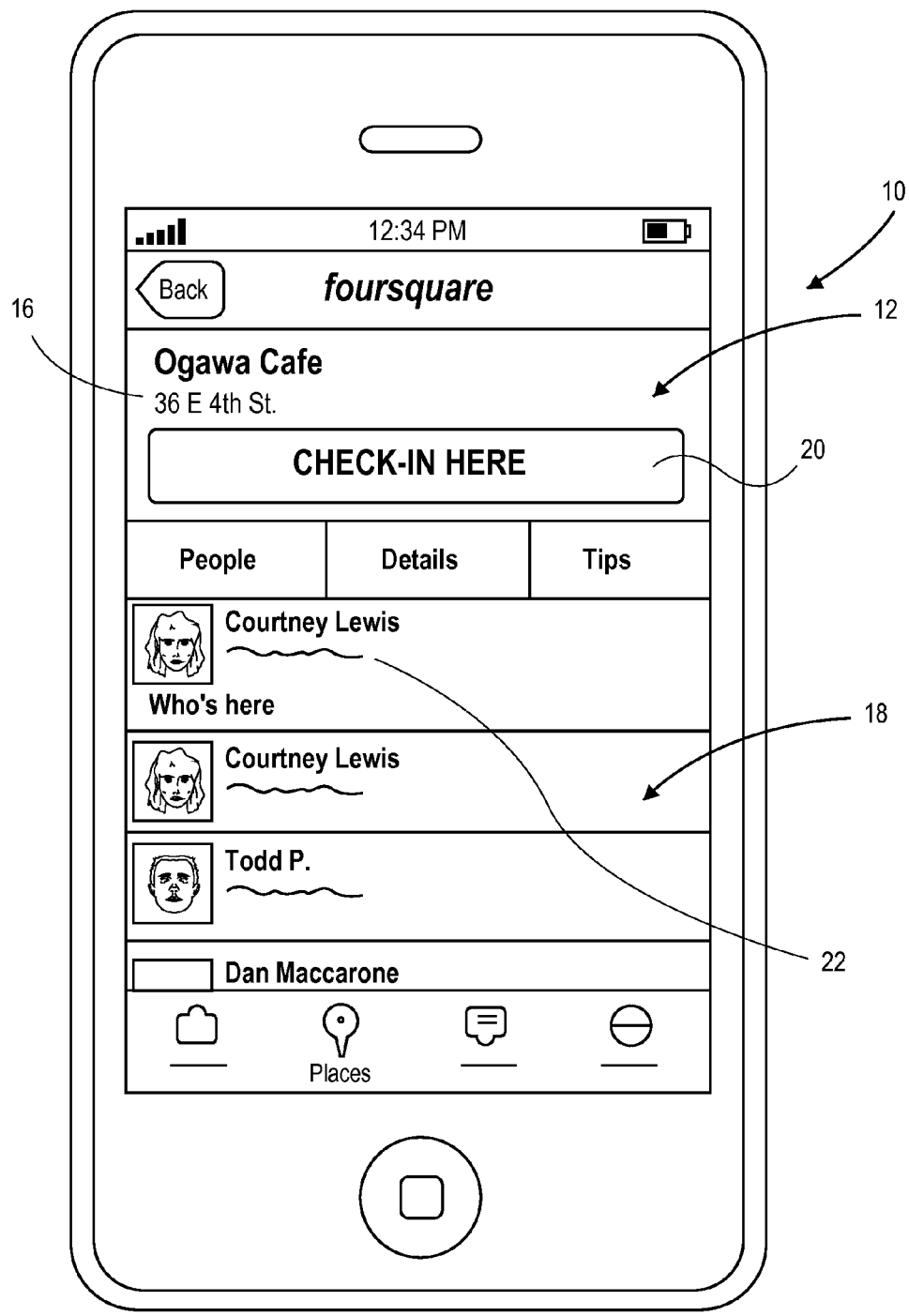
Figure 1B:
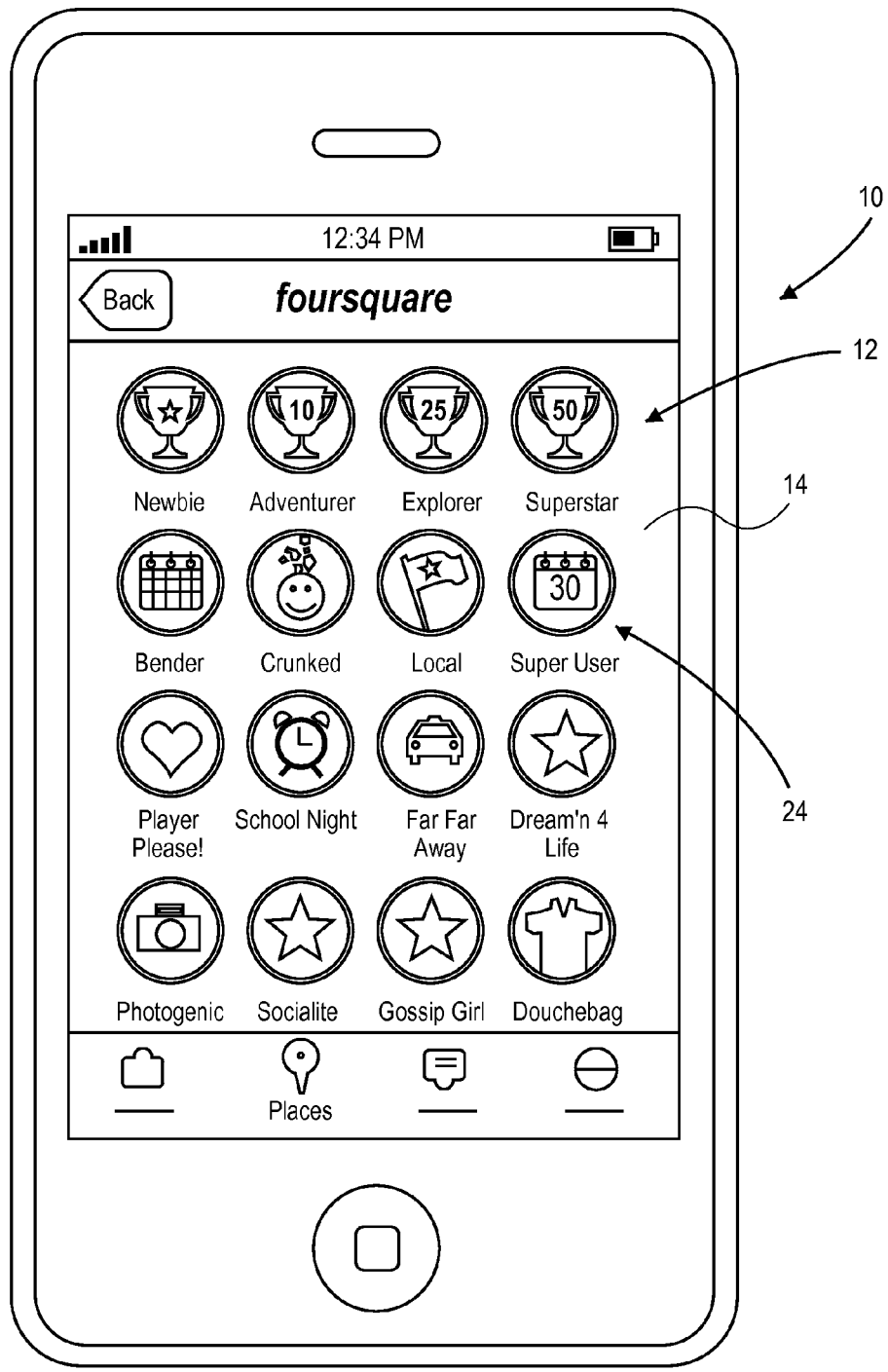
Figure 2:
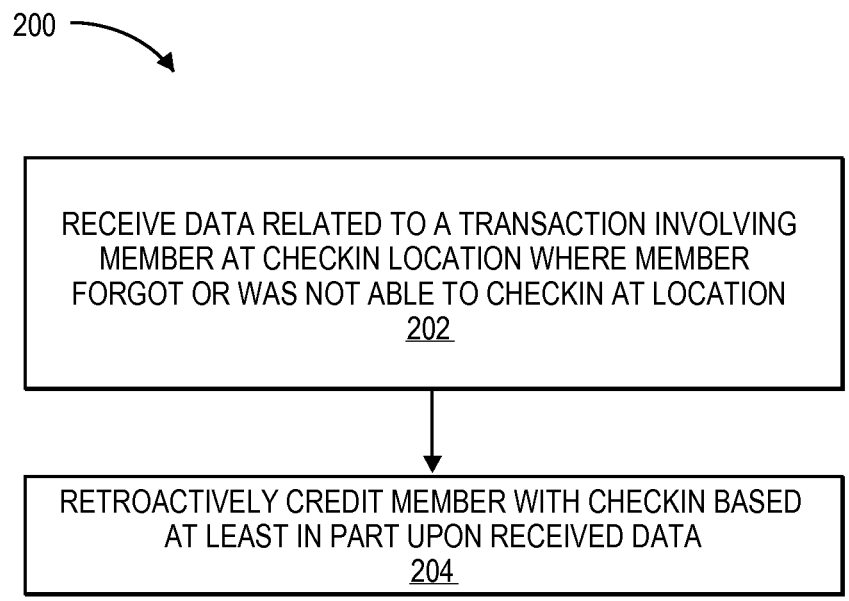
FIG. 2 is a flow diagram of one embodiment of a method for crediting a member with a missed check-in based at least in part upon transaction data.
Figure 3:
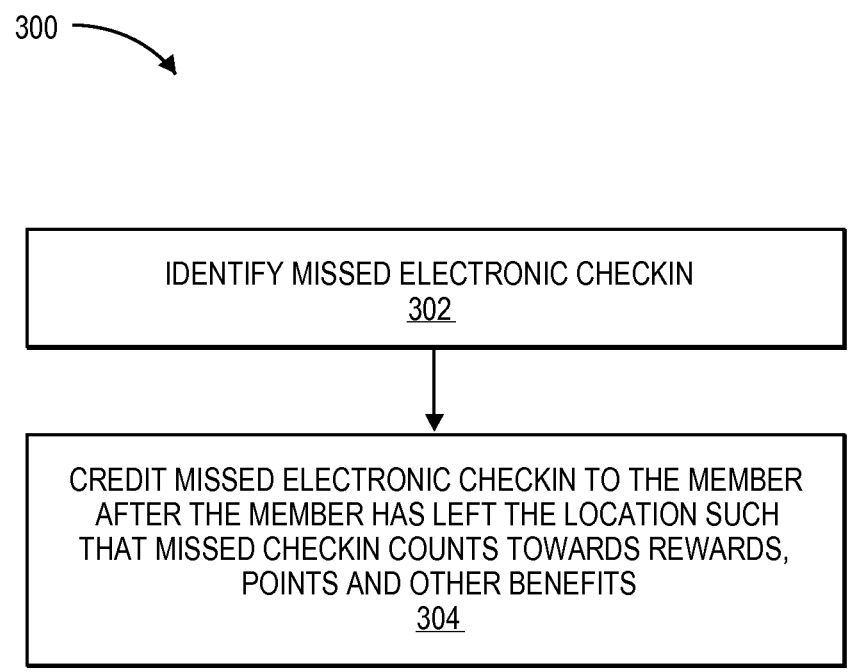
FIG. 3 is a flow diagram of one embodiment of a method for crediting a member with a missed check-in while validating the check-in such that missed and credited check-in can count towards rewards, points or other social network benefits.

Referring to FIG. 2, one embodiment of the invention is directed to a method 200 for crediting a member of a social network with a missed location-based electronic check-in. The method comprises, at step 202, receiving transaction data related to a transaction involving the member at a check-in location where the member forgot or was not able to check-in using a mobile communication device, and at step 204, retroactively credit member with check-in based at least in part upon the received transaction data. Referring to FIG. 3, another embodiment of the invention is directed to a method 300 in which missed location-based electronic check-ins that could have been completed using a mobile communication device are identified at step 302 and at step 304, the missed electronic check-in is credited to the member after the member has left the location such that the credit for the missed check-in counts towards rewards, points, awards, and other benefits of the social network. Thus, the method 300 is in contrast to social networks such as FOURSQUARE on-line social networking service, which allow post-check-ins but do not allow such post-check-ins to count towards rewards.

Thus, with embodiments, transaction data may be used to prove or validate a missed location-based check-in such that the check-in that was missed can be credited and considered to be the same as a regular check-in that was properly made with the mobile communication device at the check-in location. Further, embodiments not only provide a member of a social network with credit or allow a member to recover a missed check-in, but embodiment also reduce fraudulent location-based check-ins since embodiments utilize trusted data from a third party that confirms that the member was in fact at the check-in location. Thus, the member is able to prove to the host of the social network that "I was there" in order to receive credit for a missed check-in retroactively and after the member is no longer at the check-in location. Further, depending on the type of transaction data utilized, the transaction data confirming that the member was at a location can be generated in real time or near real time and accurately reflect an item purchased by the member from a merchant at a check-in location and the check-in location. Thus, credit for the missed check-in can be obtained right away or at a later time of the member's choosing. Further aspects of embodiments and other embodiments are described with reference to FIGS. 4-20.

Figure 4:
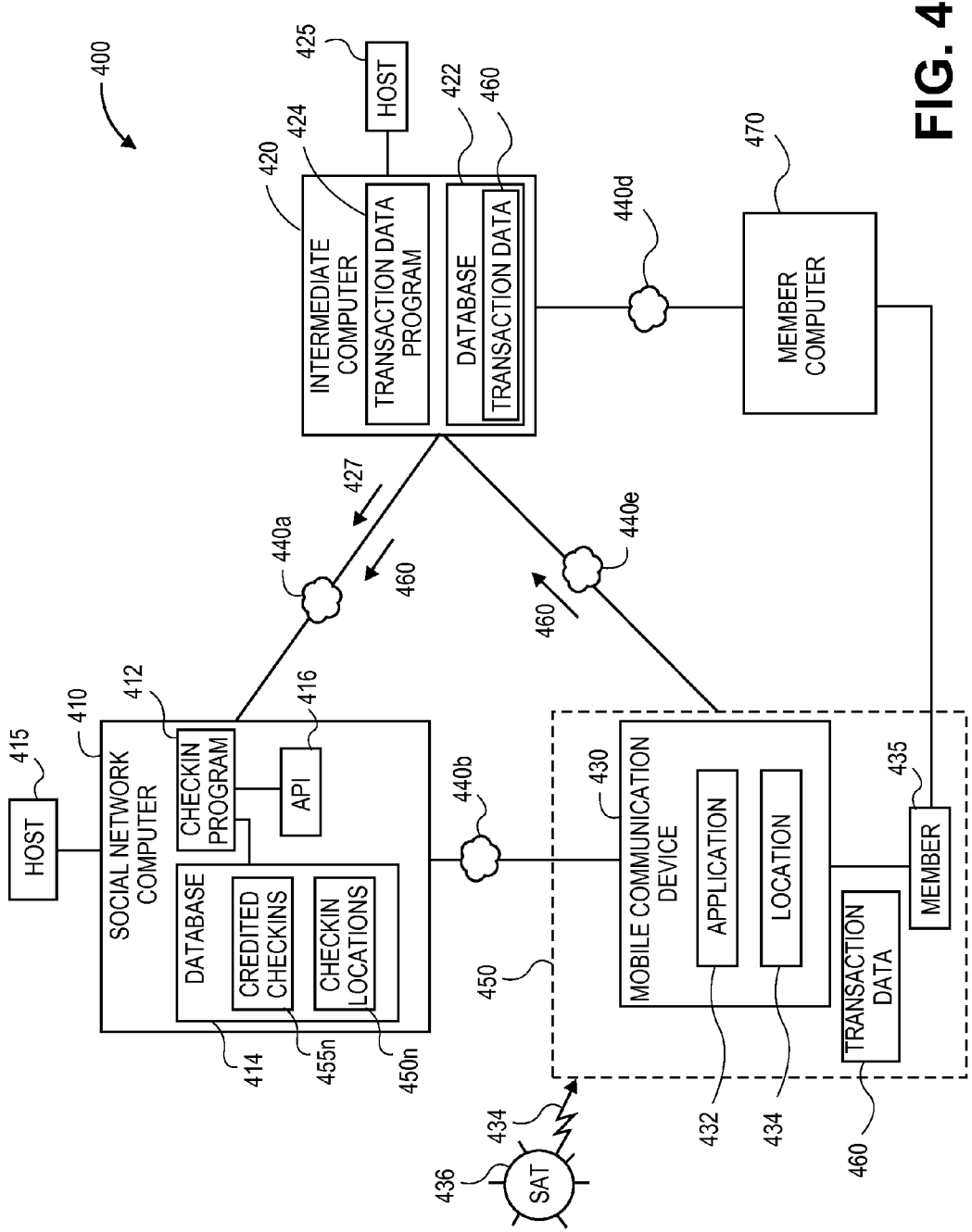
FIG. 4 is block diagram of a system constructed according to one embodiment for identifying missed location-based check-ins and crediting a member of a social network with a missed check-in using an intermediate computer or source of transaction data.

Referring to FIG. 4, a system 400 constructed according to one embodiment for crediting a missed location-based electronic check-in to a member of a social network or website comprises or involves a computing apparatus, computer or server 410 of a social network or website managed by a host 415 of the social network. Examples of such social network hosts 415 include, but are not limited to, FOURSQUARE and GOWALLA on-line social networking services (generally, social network computer 410). The system 400 also comprises or involves an intermediate computer or server 420 managed by a host 425 of the intermediate computer 420 (generally, "intermediate computer" 420), and a mobile communication device 430 of a user or member 435 (generally, "member" 435) of the social network. The social network computer 410 is operably coupled to or in communication with the intermediate computer 420 through a network 440a, and the mobile communication device 430 is operably coupled to or in communication with the social network computer 410 through a network 440b. Examples of networks 440a-b and other networks discussed herein that may be utilized for communications between these and other system 400 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 440 generally, but it should be understood that various networks, combinations of networks and communication systems, methods and protocols may be utilized in embodiments.

In the illustrated embodiment, the member 435 carries the mobile communication device 430 into a check-in location 450 (represented as a dashed boundary line in FIG. 4 surrounding the mobile communication device 430 and the member 435). The check-in location 450 may, for example, be a restaurant, a pub, a museum, a public transportation system, an office building, or various other locations. The mobile communication device 430 may be a cellular telephone, Smartphone, a laptop computer or computing tablet with wireless communication capabilities, or other mobile communication device. One example of an intermediate computer 420 that may be utilized in embodiments is a computer or server of Intuit Inc.

Transaction data 460 generated at the check-in location 450, e.g., transaction data 460 generated as a result of the member 435 purchasing an item, good or service (generally, "item") from a merchant at the check-in location 450, is transmitted from the check-in location 450 (e.g., from a merchant computer or payment device at the check-in location 450) to the intermediate computer 420 directly or indirectly through a network 440c. The intermediate computer 420 stores transaction data 460 in a database 422. A transaction data program 424 or an interface thereof or a separate interface is used to receive or retrieve transaction data 460, manage the database 422, and communicate with the source of the transaction data 460 and the social network computer 410.

The member 435 may check-in at the check-in location 450 utilizing an application 432 that executes on the mobile communication device 430 and based on location data 434, such as GPS data of the mobile communication device 430 received from a satellite 436 as is known. However, if the member 435 forgets to check-in at the check-in location 450 and then leaves the check-in location 450, the transaction data 460 generated at and transmitted from the check-in location 450 may be utilized to prove to the host 415 of the social network that the member 435 was in fact at the check-in location 450 and should receive credit for the check-in even through the member 435 has left the check-in location 450. For this purpose, transaction data 460 is transmitted from the intermediate computer 420 to the social network computer 410 or accessed by the social network computer 410. This may involve pre-determined communications between the intermediate computer 420 and the social network computer 410 (e.g., periodic transmissions of transaction data 460) or a request from the member 435 issued through the mobile communication device 430 or a computer 470 of the member 435, which is operably coupled to or in communication with the intermediate computer 420 (as illustrated in FIG. 4) and/or with the social network computer through a separate network (not illustrated in FIG. 4).

Figure 5:
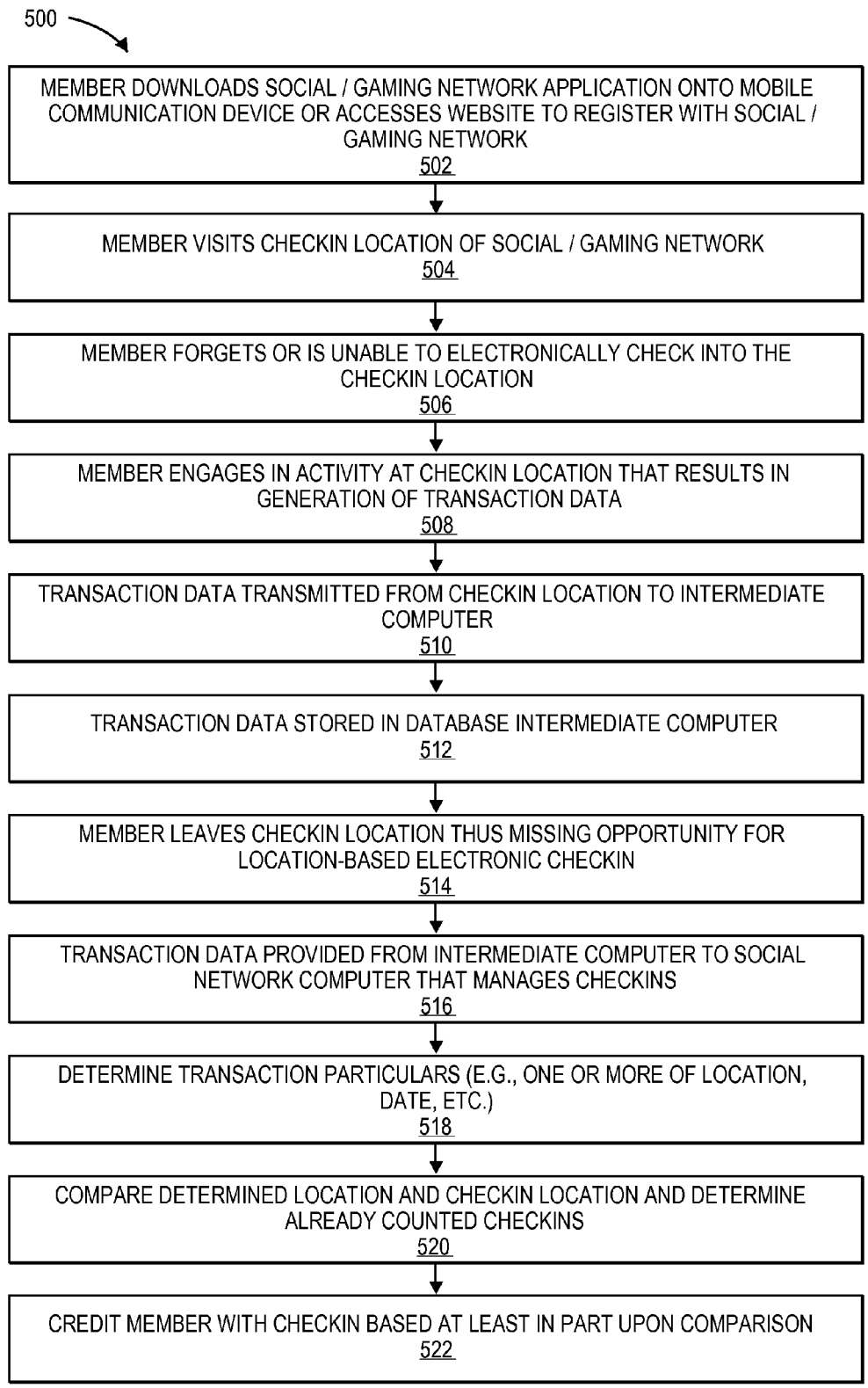
FIG. 5 is a flow diagram of one embodiment of a method for crediting a member with a missed check-in using the system illustrated in FIG. 4.

Thus, referring to FIG. 5, one embodiment of a method 500 for providing a member 435 of the social network with a credit for a missed location-based electronic check-in comprises, at step 502, the member 435 downloading the social network application 432 onto the mobile communication device 430 or accessing a website hosted by the social network computer 410 to utilize the check-in application 432 and registering with the social network. Social networks such as FOURSQUARE on-line social networking service (www.foursquare.com), for example, provide applications 432 that can be downloaded to a cellular telephone or smartphone or other mobile communication devices 430. Further aspects of such applications 432 and mobile communication devices 430 can be found on foursquare.com and gowalla.com.

Having downloaded the application 432 onto the mobile communication device 430, the member 435 may then visit various check-in locations 450 (one check-in location is illustrate in FIG. 4) at step 504. As described with reference to FIG. 4, GPS location data 434 of the mobile communication device 430 may be used to determine whether the mobile communication device 430 is within the check-in location 450 such as a restaurant, pub, museum, etc. and may also display identities of other social network members who are currently or previously checked into the same location 450. The member 435, however, through an oversight or inability to check-in, does not check into the check-in location 450 using the mobile communication device 430, thus missing the opportunity to check-in at that location 450.

For example, step 504 may involve the member 435 forgetting to check-in, attempting to check-in but not being able to check-in due to an error or failure of the mobile communication device 430 (e.g. a low battery or inoperable keypad or touch interface), the check-in application 432 (an update may be required or the application may have a virus or bug) or the social network computer 410 (e.g., the social network computer may be down). For whatever reason, the member 435 has not checked into the location 450 while the member 435 is at the location 450.

At step 508, the member 435 engages in an activity at the check-in location 450 that generates transaction data 460 (generally illustrated in FIG. 4 as being within the check-in location 450). For example, if the check-in location 450 is a coffee shop, the member 435 may purchase a cup of coffee or other item with a credit card, debit card or other form of payment. As another example, if the check-in location 450 is a restaurant, the member 435 may purchase dinner or another item. As yet another example, if the check-in location 450 is a museum, the member 435 may pay to see an exhibit.

At step 510, the transaction data 460 generated due to the member 435 engaging in a type of financial activity at the check-in location 450 is transmitted from the check-in location 450 to the intermediate computer 420, and at step 512, the transaction data 460 is stored within a database 422 of the intermediate computer 420 or at a remote computer that can be accessed by the intermediate computer 422. Transaction data 460 may be stored or sorted according to a name of the member 435 or another identifier such as a number of a transaction card utilized to purchase an item at the check-in location 450, and the database may store transaction data 460 of one or multiple members of the social network.

At step 514, after completing the transaction and visit to the check-in location 450, the member 435 leaves the check-in location 450 without checking in, thus missing an opportunity to electronically check-in at that location 450. At step 516, the transaction data 460 is transmitted to or accessed by the social network computer 410 that manages check-ins 455 of the member 435 using a check-in program 412 and check-in database 414. For this purpose, communications between the transaction data program 424 and the check-in program 412 may be conducted through an appropriate application program interface (API) 416 or other communication interface, program protocol as necessary. The transaction data 460 may also be sent to or accessed by the social network computer 110 in response to a request by the member 435 that is transmitted to the intermediate computer 120 from the mobile communication device 430 or from a member computer 470 through respective networks 440c-d, in response to the request of the check-in program 412 (e.g., a periodic request) or sent from the intermediate computer 420 to the social network computer 410 (e.g., a periodic transmission).

Figure 6:
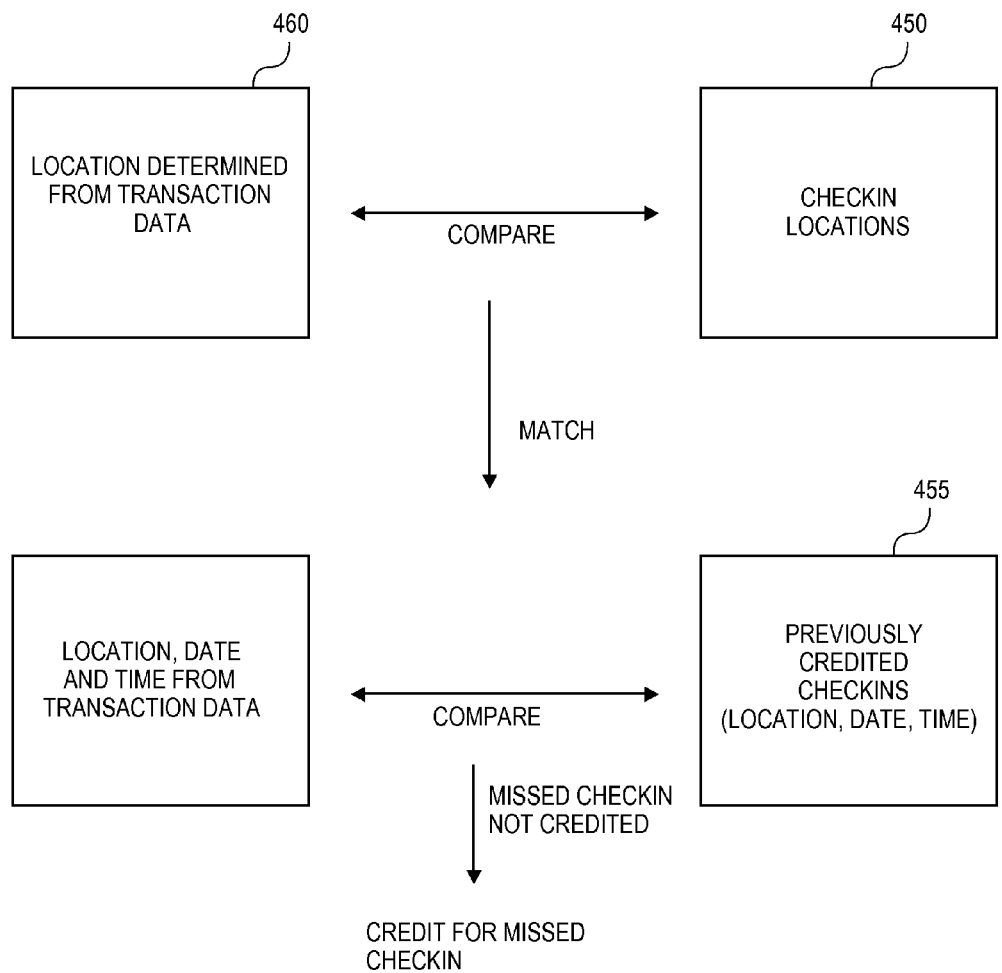

At step 518, and with further reference to FIG. 6, the check-in program 412 and/or the transaction data program 424, depending on how system 400 embodiments are configured to perform certain steps, determines the transaction particulars or details (e.g., one or more of location, date, time, etc.) from the transaction data 460, compares the determined location, date and time (or other types or combinations of times of transaction data 460 utilized) and the check-in location 450, and at step 522, retroactively credits the member 435 with the missed location-based electronic check-in based at least in part upon comparison. Thus, with embodiments, the member 435 is credited with the missed check-in even if the member 435 is no longer at the check-in location 450, and the host 415 of the social network can be confident that the missed check-in is legitimate since it is supported by transaction data provided by a trusted host 425 and intermediate computer 420 that collects and stores transaction data 460. It should be understood that the comparisons performed to determine whether a missed check-in should be credited may involve different considerations and data. Thus, FIG. 6 is provided to generally illustrate one example of how types of transaction data may be analyzed relative to check-in locations and prior credited check-ins to determine whether a missed check-in should be credited to the member 435.

According to one embodiment, the social network computer 410 performs steps 516-520 such that the social network computer 410 determines the transaction particulars, compares the determined merchant location 450 and valid or active check-in locations 450*n* of the social network stored in the check-in database 414, and assuming the check-in being analyzed is not already included in a table or summary 455 of member check-ins for which the member 435 has already received credit, the check-in program 412 credits the member 435 with the missed check-in if the determined merchant location or source of the transaction data 460 matches a check-in location 450*n* of the database 414 and was not already counted in the table or summary 455 of the member's counted check-ins such that each valid check-in is counted once.

Figure 7:
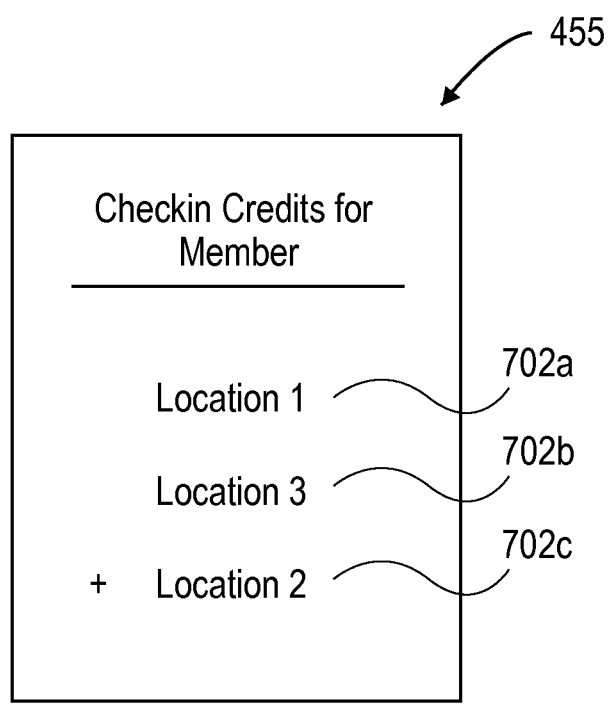
FIG. 7 generally illustrates a missed location-based electronic check-in being credited to a member of the social network.

FIG. 7 generally illustrates previously counted check-ins 702*a*, 702*b* (Loc1 and Loc3) and a missed check-in 702*c* at Loc 2 that is credited (indicated by "+") to the member 435 and added to the database or list of credited check-ins 455 as a result of embodiments identifying this missed check-in based at least in part upon transaction data 460 generated at a valid check-in location 450 and this check-in not being included in the list or table 455 of previously credited check-ins 702. It should be understood that comparisons with the valid check-ins 450 and previously credited check-ins may involve different types of transaction data 460. For example, embodiments may involve the location from which the transaction data 460 was generated, the location and a date the transaction data 460 was generated, the location, date and time the transaction data 460 was generated.

In another embodiment, the intermediate computer 420, e.g., using the transaction data program 424, may be programmed to determine the particulars of the transaction data 460, compare the determined merchant location and check-in locations 450*n* of the social network, and assuming a check-in has not been previously credited, transmit a message or result 427 to the social network computer 110 indicating that the determined merchant location matches a check-in location 450*n* of the social network and that this check-in should be credited since it was not previously credited. For this purpose, the intermediate computer 120 may receive or access the list of valid check-in locations 450*n* and the list of previously credited check-ins 455*n* stored in the check-in database 414. The social network computer 110, e.g., using the check-in program 412, may then credit the member 435 with the missed location-based electronic check-in based at least in part upon the message 427 sent by the intermediate computer 120.

When a missed check-in is to be credited to the member 435, the missed check-in can be credited automatically by the check-in program 412 or the check-in program 412 may send a message to the member requesting the member 435 to confirm that the missed check-in should be credited.

Figure 8:
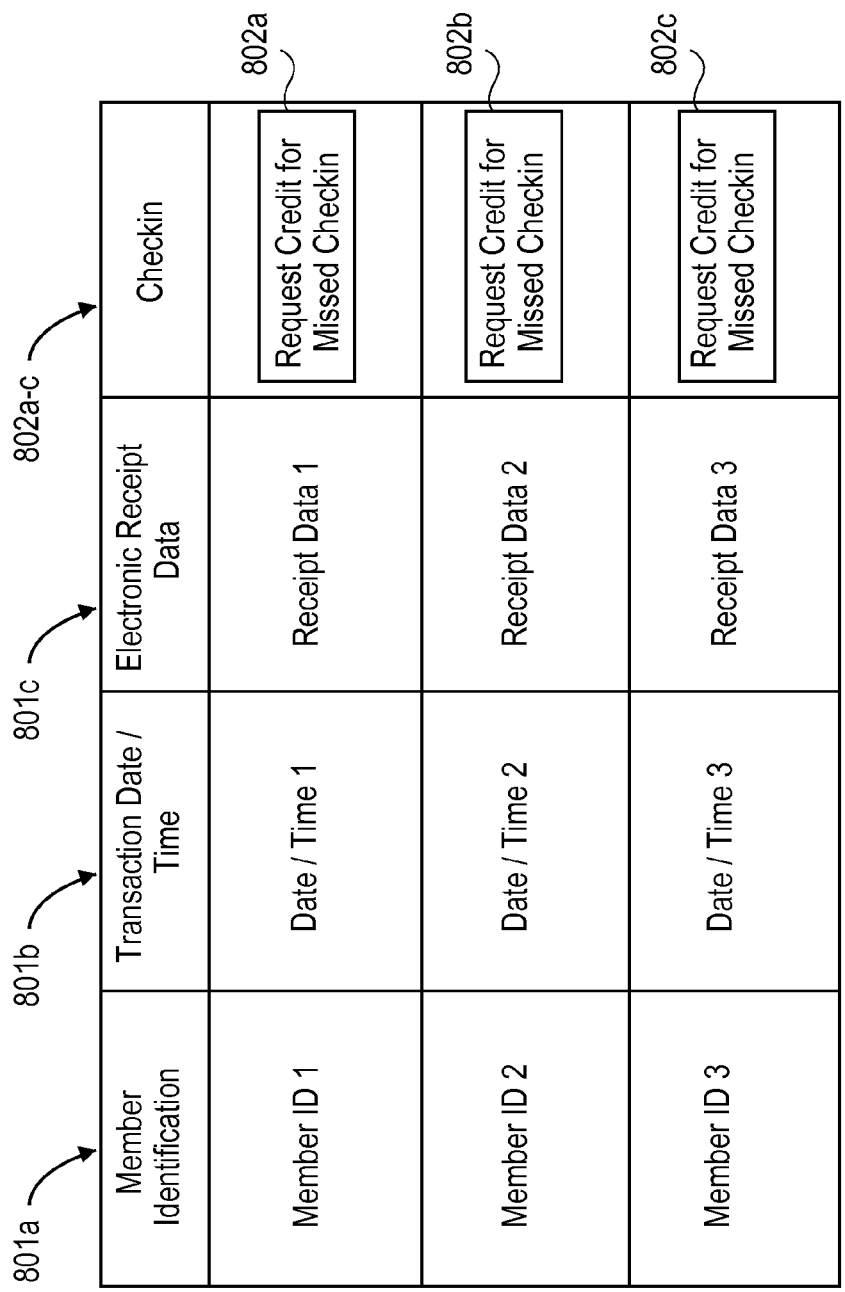
FIG. 8 generally illustrates an interface of a transaction data program that displays an icon or button that can be selected by a member to allow the member to request credit for a missed check-in related to certain transaction data.

Referring to FIG. 8, in one embodiment, the member 435, using the mobile communication device 430 or the computer 470 to access the intermediate computer 120, may utilize the transaction data program 424 that lists transaction data 460 of member 435 purchases or other transactions at the check-in location 450. In the illustrated example, the transaction data program 424 displays transaction data 460 such as transaction date 801*a*, a type of transaction 801*b* and a location 801*c* (generally, transaction data 460). The transaction data 460 may be displayed with icons or buttons 802 that can be selected by the member 435 to request credit for the check-in that was missed at the location where that transaction occurred. In response to the member 434 selecting the icon or button 802 within a screen displayed by the transaction data program 424, the intermediate computer 420 may transmit transaction data 460 of the selected transaction to the social network computer 410, which may then determine whether a check-in has already been credited, and if not, issue the credit for the missed check-in to the member 435.

While embodiments described above with reference to FIGS. 1-8 are described with reference to a single member 435 and determining whether to credit that member 435 with a missed location-based electronic check-in based at least in part upon transaction data 460 of that location 450, embodiments may also involve multiple members 435 whose respective transaction data 460 stored in the database 422 of the intermediate computer 420 is utilized to credit the respective members 435 with check-ins that were missed at respective check-in locations 450. For example, as shown in FIG. 9, embodiments may involve respective transaction data 460*a-c* transmitted from respective check-in locations 450*a-c* such as a restaurant, pub, museum, etc. as a result of respective transactions (e.g., purchasing respective items at these locations). This transaction data 460*a-c* can be stored in the transaction database 422 by the transaction data program 424, e.g., according to member name, number of the transaction or rewards or club card utilized to purchase an item, etc. The check-in program 412 and/or the transaction data program 424 may then perform method steps to determine whether respective credits for respective missed check-ins are due to respective members 435*a-c*.

Figure 10A:
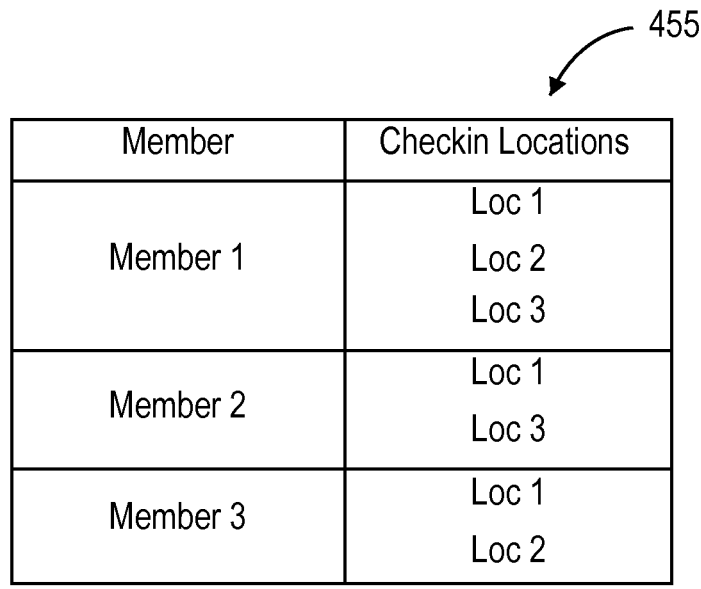
Figure 10B:
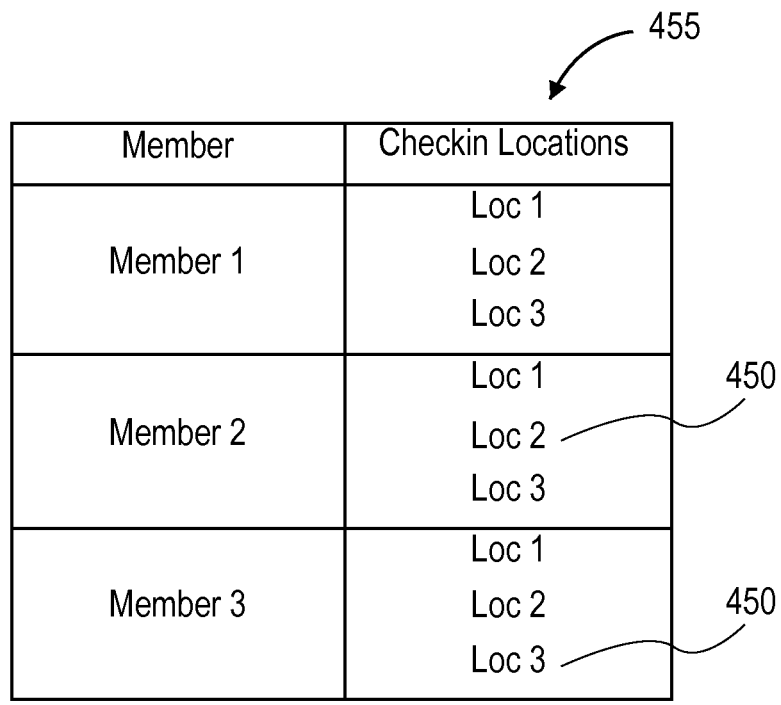

As generally illustrated in FIG. 10A, assume as an example that all three Members 1-3 went to the same three check-in locations (1-3), and per the check-in table 455, Member 1 has not missed any check-ins, Member 2 missed one check-in at location 2, and Member 3 has missed one check-in at location 3. With embodiments, and as generally illustrated in FIG. 10B, Member 2 would be credited with the check-in missed at Location 2, and Member 3 would be credited with the check-in missed at that Location 3, and after application of embodiments, FIG. 10B shows each of the members being credited with all three check-ins.

Thus, it should be understood that while embodiments are described with reference to a single missed check-in and a single member, embodiments may involve multiple members (e.g., tens, hundreds and thousands of members) and various numbers of missed check-ins for each member. Further, while embodiments are described with reference one social network computer 410, an intermediate computer 420 may provide transaction data 460 to multiple social network computers of different services (e.g. FOURSQUARE and GOWALLA on-line social networking services). Multiple intermediate computers 420 may also be utilized for this purpose and may provide transaction data 460 to one or multiple social network computers 410.

Figure 11:
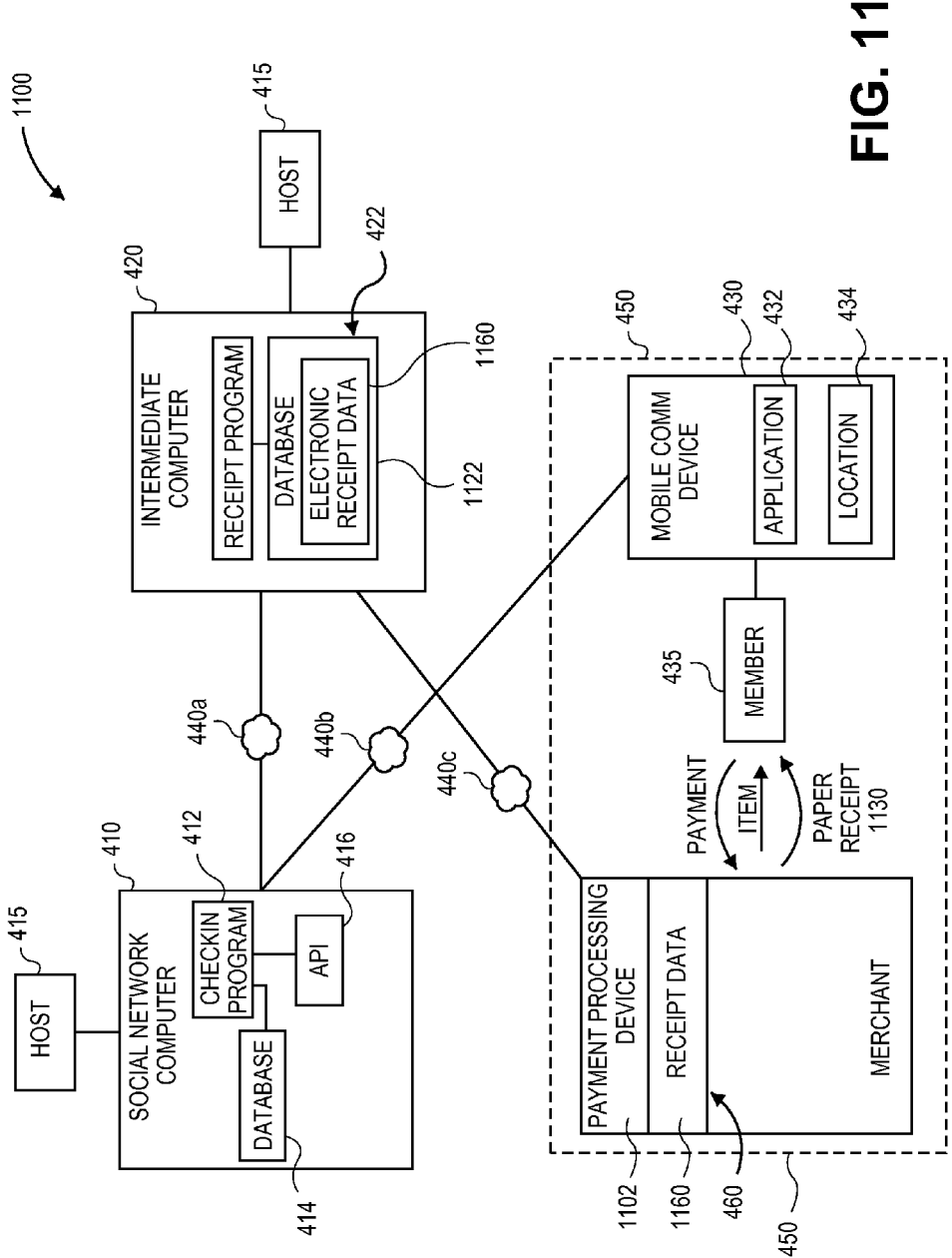
FIG. 11 is block diagram of a system constructed according to another e embodiment for identifying missed location-based check-ins and crediting a member of a social network with a missed check-in using transaction data in the form of receipt data received from a payment device of a merchant and stored at an intermediate computer.

Referring to FIG. 11, one embodiment of a system 1100 constructed according to one embodiment that may be utilized to perform method embodiments described above involves transaction data 460 in the form of electronic receipt data 1160. In this embodiment, the intermediate computer 420 may host a receipt program 1124. In the illustrated embodiment, receipt data 1160 which, according to one embodiment, may identify an item purchased by the member 435 at a check-in location 450, the purchase date/time, the purchase amount, and a merchant name and location, is generated by respective payment devices 1102 of respective merchants at respective check-in locations 450*n* (one payment device 1102 of one merchant at one check-in location 450 is shown for ease of explanation) and may be collected or retrieved by the receipt program 1124 executing on the intermediate computer 420 or on a remote computer accessed by the intermediate computer 420 and stored in the database 422. One example of a receipt program 910 that may be utilized in embodiments for this purpose is QUICKRECEIPTS personal finance program of Intuit Inc. Further details regarding one manner of how QUICKRECEIPTS personal finance program may be implemented is disclosed in U.S. application Ser. No. 12/609,922, which issued as U.S. Pat. No. 8,095,439, the contents of which are incorporated herein by reference.

Figure 12:
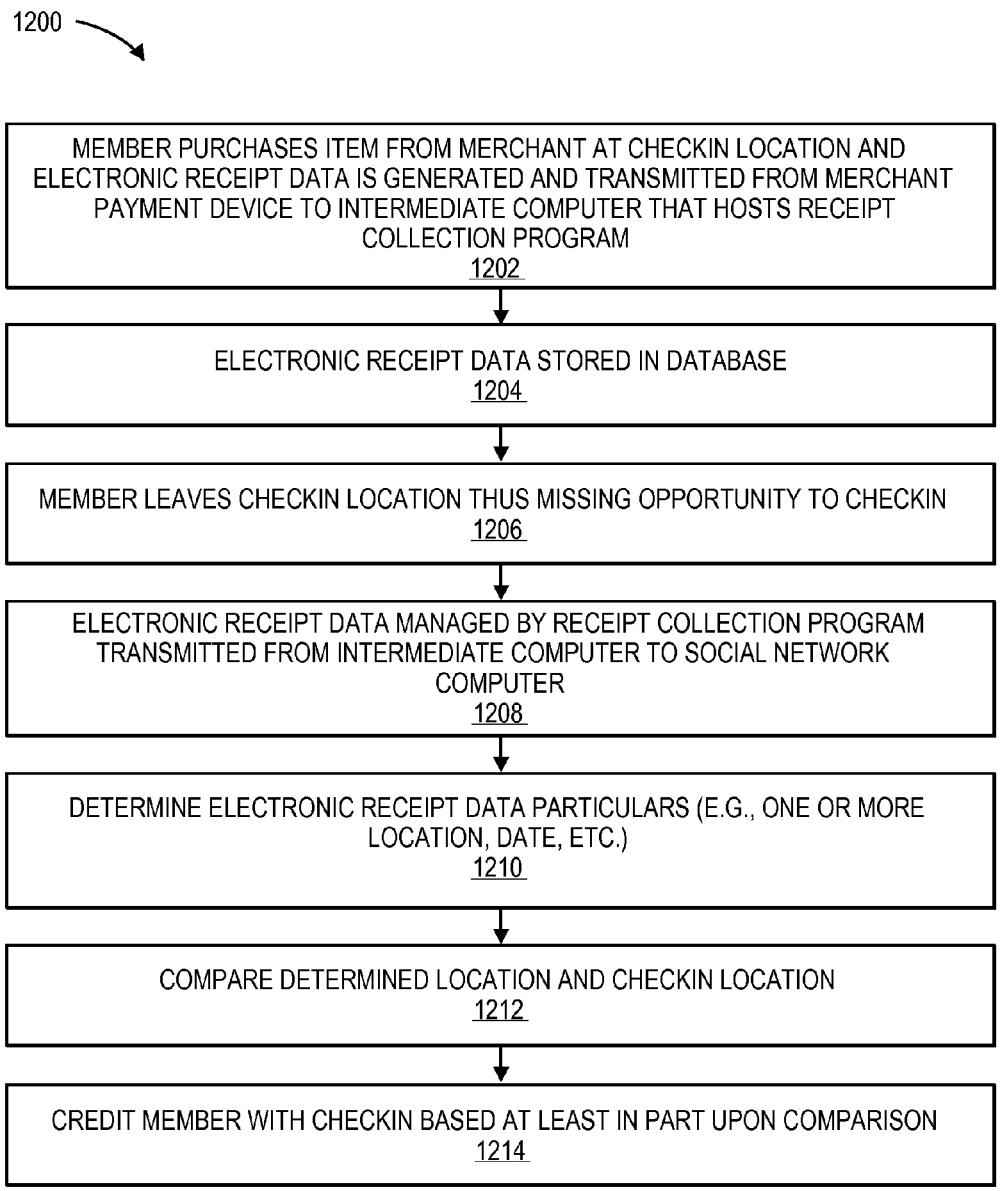
FIG. 12 is a flow diagram of one embodiment of a method for crediting a member with a missed check-in using transaction data comprising receipt data and system illustrated in FIG. 12.

More particularly, as shown in FIG. 12, at step 1202, the member 435 visits the check-in or merchant location 450, engages in an activity at the check-in location 450 that results in receipt data 1160 (e.g. using a transaction card and/or membership card or other form of payment), and the intermediate computer 420 receives or retrieves receipt data 1160 from a payment devices 1102 (such as a Point of Sale (POS) terminal) of a merchant at a check-in location 450.

In other system embodiments, one or more retailer or third party or intermediate computers or systems such as a retailer data source (RDS)) may be used to collect receipt data 1160 from merchants and provide collected receipt data 1160 to the intermediate computer 420. One example of an intermediate computer or system that may be utilized for this purpose is a computer or system of Afterbot, Inc. Thus, embodiments may involve receiving receipt data 1160 directly from merchants at a check-in location 450 or from other intermediate computers that collect receipt data 1160 from merchants at a check-in location 450, or both.

At step 1204, receipt data 1160 of the member 435 of the social network is stored in the database 1122, e.g., as a table 1300 or other data structure 1300 as generally illustrated in FIG. 13. The table 1300 may, for example, identify purchases by various members 435 of the social network by member identifiers 1302 (e.g., one or more of name, QUICKRECEIPTS personal finance program account identification number, social security number, e-mail address, transaction card number, store card number such as a BEST BUY card number, a number of a card associated with a universal receipt or loyalty program such as QUICKRECEIPTS personal finance programs, a credit card number, or other unique identifying information), a purchase timestamp 1304 (e.g., date, or date and time), and receipt data 1306 for respective members 435n. BEST BUY is a registered trademark of BBY Solutions, Inc., South Richfield, Minn. The receipt data 1160 may include, for example, a transaction date, item identifier (such as name, model or part number, item code, etc.), an identifier of the merchant who sold the item (e.g., name, number or other identifier) and a merchant location (e.g., city, state or store number).

Figure 14A:
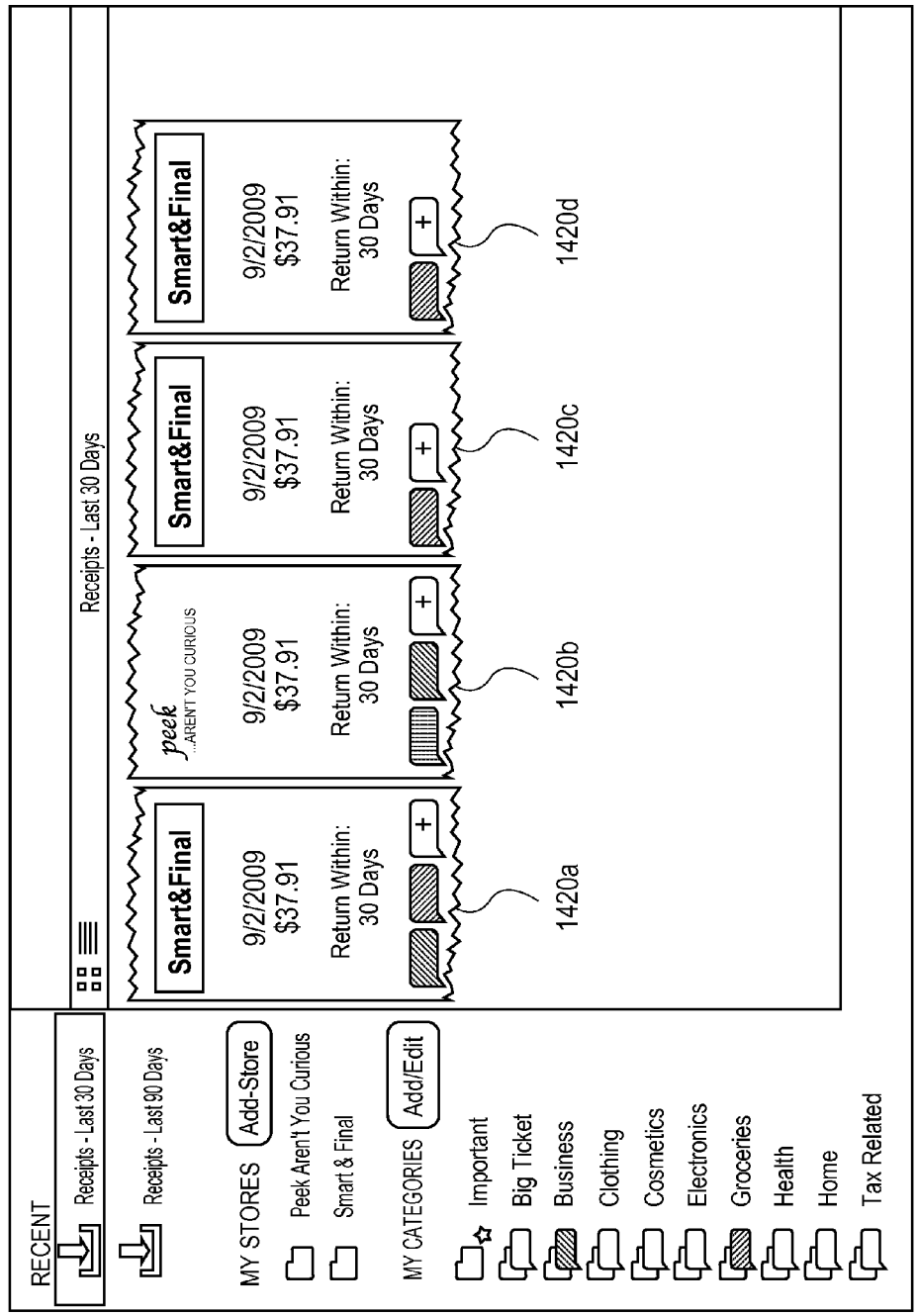
Figure 14B:
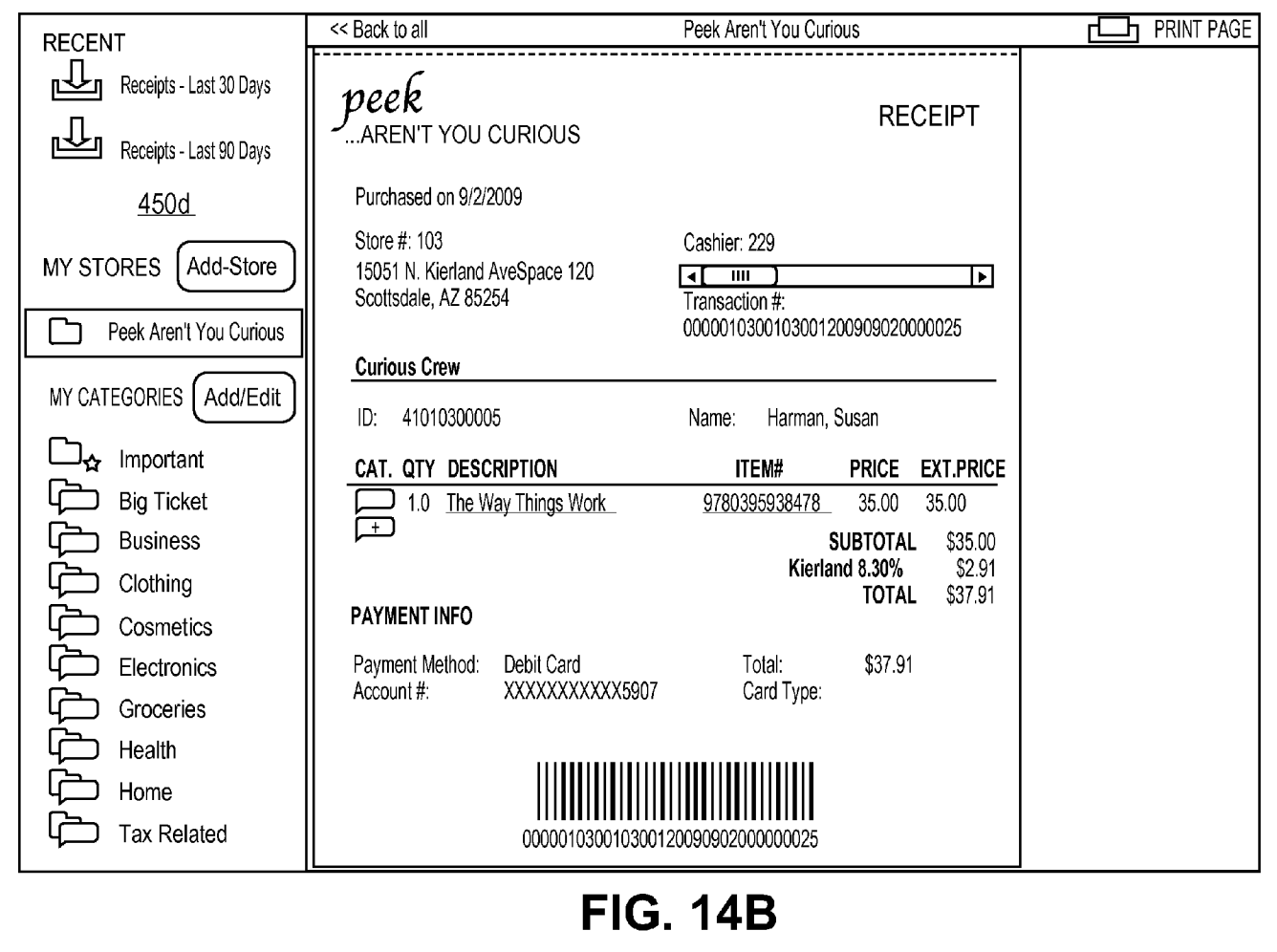

Receipt data 1160 may be displayed by QUICKRECEIPTS personal finance program using, for example, interfaces or display screens shown in FIGS. 14A-B, which include icons or objects 1420a-d (generally, 1420) representing electronic receipts generated based on receipt data 1160 received from payment devices 1102 of respective merchants at respective check-in locations 450. Selecting an icon or object 1420, more specific receipt data is displayed as shown in FIG. 14B such as date and/or time, location (e.g. store number or address) and other particulars about the transaction including item identifications, price paid, payment method, etc. U.S. application Ser. No. 12/609,922, which issued as U.S. Pat. No. 8,095,439, which was previously incorporated herein by reference, discloses other aspects of one implementation of QUICKRECEIPTS personal finance program that may be utilized in embodiments.

Referring again to 12, at step 1206, the member 435 leaves the check-in location 450 without checking in at the location 450, thus missing opportunity to check-in, The member 435 may have forgotten to check-in or is unable to check-in. At step 1208, the electronic receipt data 1160 is transmitted from intermediate computer 420 to the social network computer 410 that manages check-ins. The social network computer 410 and/or the intermediate computer 420 are utilized to determine receipt data particulars at step 1210 (e.g., date, time, etc.), compare the determined location and check-in location at step 1212, and credit the member 435 with the check-in at step 1214 based at least in part upon comparison assuming that the check-in is not already credited 455 to ensure that check-in credits are not duplicated.

Figure 15A:
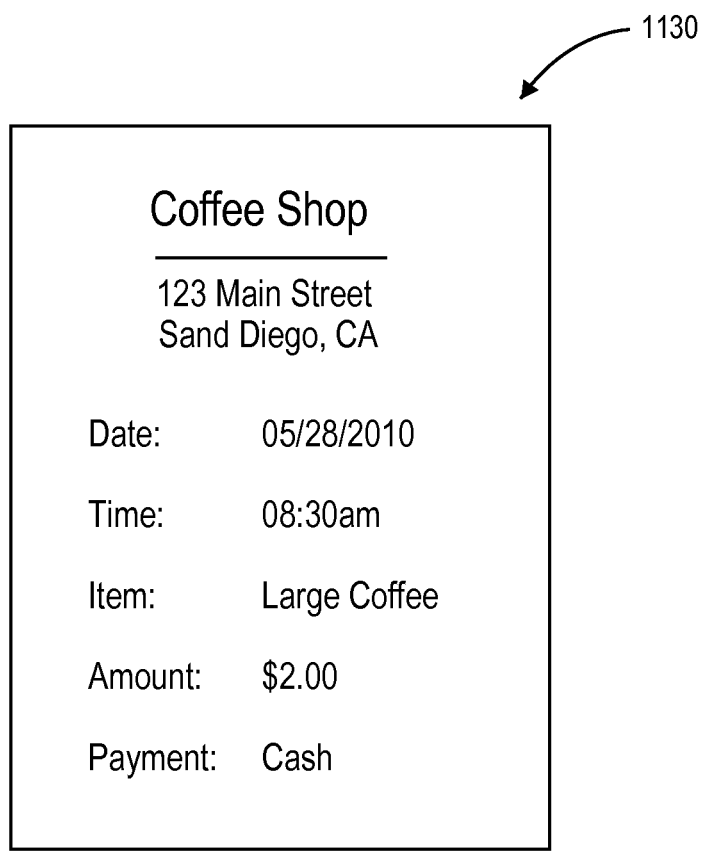
FIG. 15A illustrates an example of a paper receipt provided to a member for purchasing an item from a merchant at a check-in location.

Referring again to FIG. 11, and with further reference to FIGS. 15A-B, although embodiments are described with reference to electronic receipt data 1160 received from merchants at a check-in location 450, receipt data 1160 may also be in the form of a paper receipt or electronic mail receipt 1130 that is provided from the merchant to the member 435. The member 435 may acquire an electronic image of the receipt 1130 by taking a photograph 1520 of the receipt using a camera 1520 of the mobile communication device or a separate camera 1520 or by scanning 1525 the receipt 1510, e.g. to generate a pdf version of the receipt, using a computer 470 and scanner. In order to read the receipt data 1130, the computer intermediate computer 120 and/or the social network computer 110 may utilize Optical Character Recognition (OCR) or another suitable text reading system to read the receipt 1130 particulars from the electronic image of the receipt 1130.

Figure 15B:
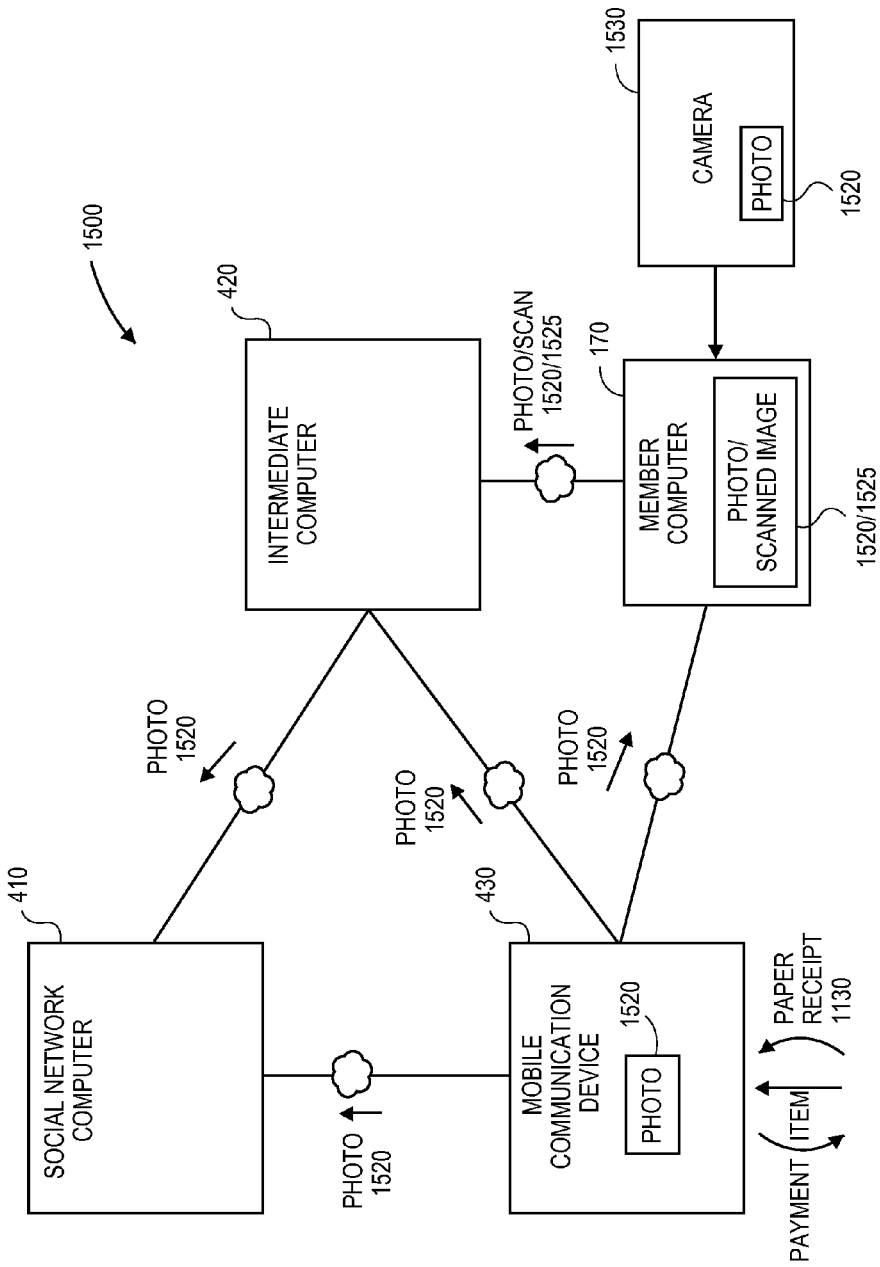
FIG. 15B illustrates a system constructed according to another embodiment for transmitting a photograph of the paper receipt to at least one of the intermediate computer and the social network computer to identify a missed check-in by the member.

As shown in FIG. 15B, a photograph 1520 of the receipt acquired with the mobile communication device 430 may be sent directly to the social network computer 110 and/or to the intermediate computer 420. The photograph 1520 may also be sent to a member computer 170 from which it may be sent to the intermediate computer 420 (as illustrated in FIG. 15B) and/or to the social network computer 410. In another embodiment, a photograph of the receipt 1510 is acquired using the mobile communication device 430 or a camera 1530 from which an image of the receipt 1510 is downloaded to the computer 470 and then transmitted to the social network computer 410 and/or intermediate computer 420. In yet another embodiment, the member 435 may take a photograph 1520 of the merchant store at the check-in location 450 using the mobile communication device 430. The photograph 1520 may include timestamp information such as date and time the photograph 1520 was taken. Thus, a photograph 1520 of a paper receipt 1130 or a scan 1525 of the receipt 1130 contains transaction data 460 such as a merchant location, date and time (as generally illustrated in FIG. 15A), and may be utilized to determine whether the member 435 should be credited with a missed location-based electronic check-in.

Figure 16A:
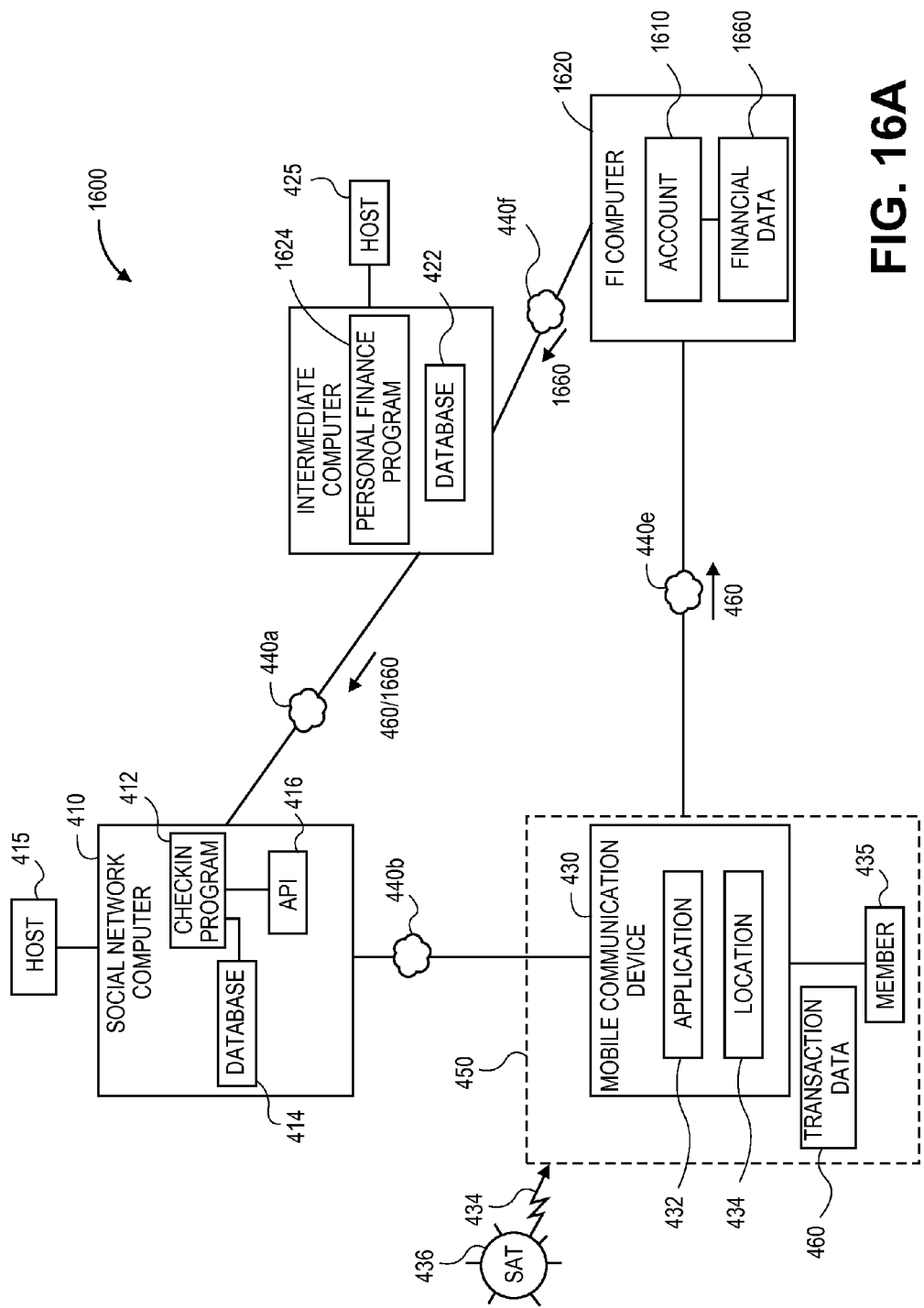
FIG. 16A is block diagram of a system constructed according to yet another embodiment for identifying missed location-based check-ins and crediting a member of a social network with a missed check-in using a personal finance program that retrieves or accesses transaction data in the form of financial data from a financial institution at which a member of the social network has an account, and FIG. 16B generally illustrates types of financial data that may be stored at a financial institution computer.
Figure 16B:

Referring to FIGS. 16A-B, a system 1600 constructed according to another embodiment involves transaction data 1660 from a computer 1620 of a financial institution (FI) such as a bank, a savings and loan, a credit union, a credit card company, a mortgage company or a loan company. For ease of explanation, reference is made to a financial institution (FI). In this embodiment, the payment device 1102 of a merchant is operably coupled to or in communication with the FI computer 1620 through a network 440e and may also be operably coupled to the intermediate computer 420 (not illustrated in FIG. 16A). The member 435 has an account 1610 at the FI that processes payment for the member's purchase of an item from a merchant at the check-in location 450 using, e.g., a form of payment such as a credit card, debit card, check, electronic check, ATM withdrawal, ACH and other forms of electronic transactions processed by FIs. FIG. 16B generally illustrates types of transaction data 1660, e.g., within an on-line or other account, including a transaction date, description (e.g., form of payment, merchant identifier, store location, etc.), the amount of the transaction and a running balance of the member's account due to these transactions. The FI computer 1620 is operably coupled to or in communication with the intermediate computer 420 through a network 440f, and the intermediate computer 420 hosts or accesses a personal finance program 1624 such as QUICKEN, MINT FINANCEWORKS personal finance programs, etc. (available from Intuit Inc.)

These and other personal finance programs 1624 will typically include or manage transaction or financial data 1660 including balances and transactions such as interest payments, credits and debits if bank accounts, credit card accounts, merchant credit accounts, brokerage and investment accounts, loans, medical accounts, insurance accounts, and other types of financial information. The financial data 1660 may also include data created by a computerized personal finance application, such as spending information, savings information, budget information, and other financial profile information, which may categorized, organized, or otherwise created by the computerized personal finance application for analysis and use by the member 435.

The personal finance program 1624 is operable to access transaction data 1660 from one or more of a plurality of financial accounts (one account at one FI is shown for ease of explanation) of the member 435. Financial data may include data from bank accounts, credit card accounts, brokerage and investment accounts, loans, medical accounts, insurance accounts, and any other financial information.

Figure 17:
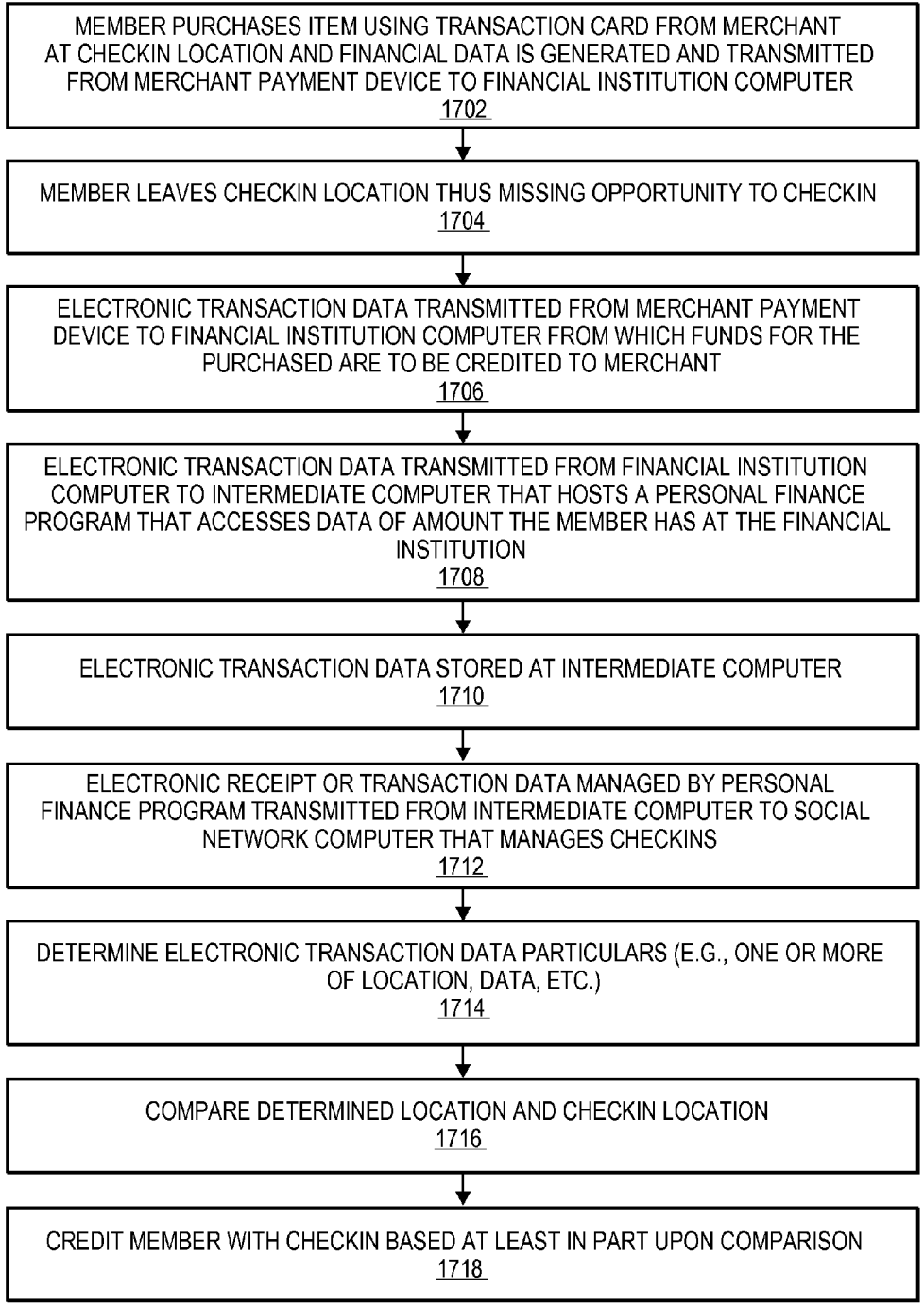
FIG. 17 is a flow diagram of one embodiment of a method for crediting a member with a missed check-in using the system illustrated in FIG. 16A.

Referring to FIG. 17, a method 1700 for crediting a member of a social network with a missed location-based electronic check-in that may be implemented with a system 1600 described with reference to FIGS. 16A-B comprises, at step 1702, the member 435 visiting the check-in or merchant location 450 and engaging in an activity at check-in location 450 such as purchase of an item using transaction card which, in turn, generates transaction data 1660 that is transmitted from the merchant payment device 1102 to the financial institution computer 1620. At step 1704, the member 435 leaves check-in location 450 thus missing opportunity to check-in at that location. At step 1706, electronic transaction or financial data 1660 is transmitted from the merchant payment device 1102 to a financial institution computer 1620 at which the member 435 has an account 1624 and from which funds for the purchase are to be used to pay the merchant. This transaction and associated data 1660 are stored in a database 1622 of the financial institution computer 1620.

At step 1708, electronic transaction or financial data 1660 is transmitted from the FI computer 1620 to the intermediate computer 420 and stored in the database 422 of the intermediate computer 420 at step 1710. The FI computer 1620 hosts or utilizes a personal finance program 1624 such as QUICKEN, MINT and FINANCEWORKS personal finance program that is operable to accesses transaction or financial data 1660 of the account 1624 at the financial institution. Such programs may, for example, access a member's bank accounts such as savings, checking and money market accounts and download data of such accounts including credits and debits of such accounts.

At step 1712, electronic transaction or financial data 1660 managed by the personal finance program 1624 is transmitted from the intermediate computer 420 to the social network computer 410 that manages location-based electronic check-ins. The data 1660 may be transmitted from the intermediate computer 420 to the social network computer 410 or accessed by the social network computer 410. This may involve pre-determined communications between the intermediate computer 420 and the social network computer 410 (e.g., periodic updates) or a request from the member 435 issued through a computer 480 of the member 435.

The social network computer 410 and/or the intermediate computer 420 perform steps 1714-1718 which, as described above, involve determining electronic transaction or financial data particulars (e.g., one or more of location, date, time etc.), comparing the determined location and a check-in location, and crediting the member 435 with the missed check-in if the determined location matches the check-in location, assuming that the check-in is not already credited 455 to ensure that check-in credits are counted once and not duplicated.

Figure 18:
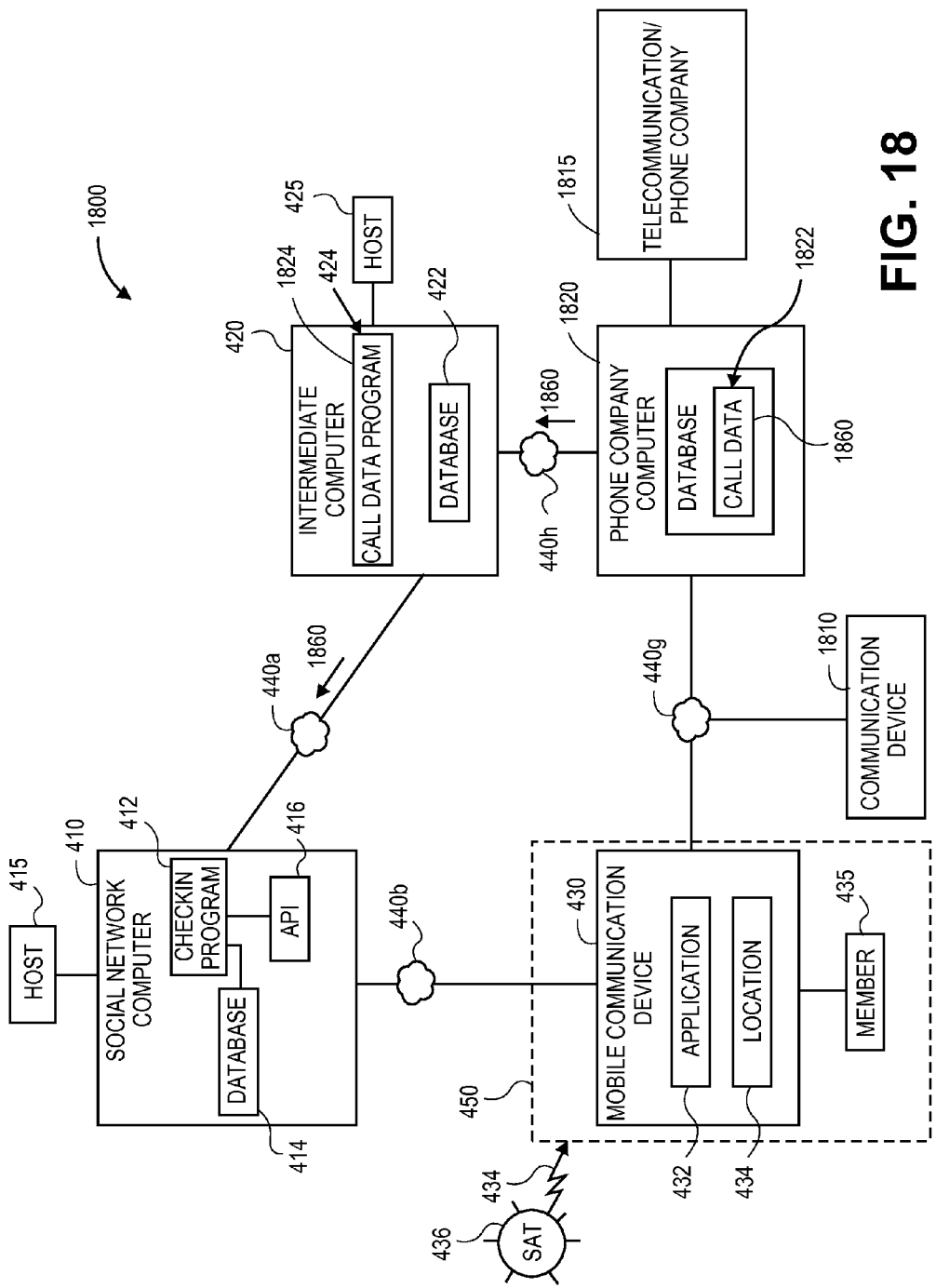
FIG. 18 is block diagram of a system constructed according to yet another embodiment for identifying missed location-based check-ins and crediting a member of a social network with a missed check-in using transaction data in the form of communication data received from a telecommunications or phone company.

Embodiments may also be implemented with transaction data provided by other sources or intermediate computers and utilized to determine whether a check-in was missed. For example, referring to FIG. 18, a system 1800 constructed according to another embodiment includes certain system components described above, and in the illustrated embodiment, utilizes transaction data 1860 in the form mobile communication data such as a data of a call made or received using the mobile communication device 430 while the member 435 is at the check-in location 450. More specifically, in the illustrated embodiment, the mobile communication device 430 of the member 435 is in communication with another communication device 1810 (which may or may not be a mobile communication device) through a network 440g that is a network such as a cellular or wireless network that is a network of or managed or utilized by a telecommunications company 1815 such as a phone or wireless company (generally, phone company 1815), examples of which include Cellco Partnership dba Verizon Wireless, AT&T, Inc., etc. Data 1860 of the communication or call may include, for example, a date, time, number called, call duration, etc. and this transaction data 1860 is stored to a database 1822 of the phone company computer 1820. The phone company computer 1820 is operably coupled to or in communication with the social network computer 410 directly or indirectly through the intermediate computer 420 (as shown in FIG. 18 through network 440h) depending on how the system 1800 is configured and the communication configurations of the check-in program 412, transaction data program 424 and communication interfaces. In the illustrated embodiment, the transaction data or call data program 1824 is configured for communications with the phone company computer 1820 and the social network computer 410 and the intermediate computer 420 communicate with each other, but other system configurations may also be utilized in embodiments with appropriate communication interfaces.

Figure 19:
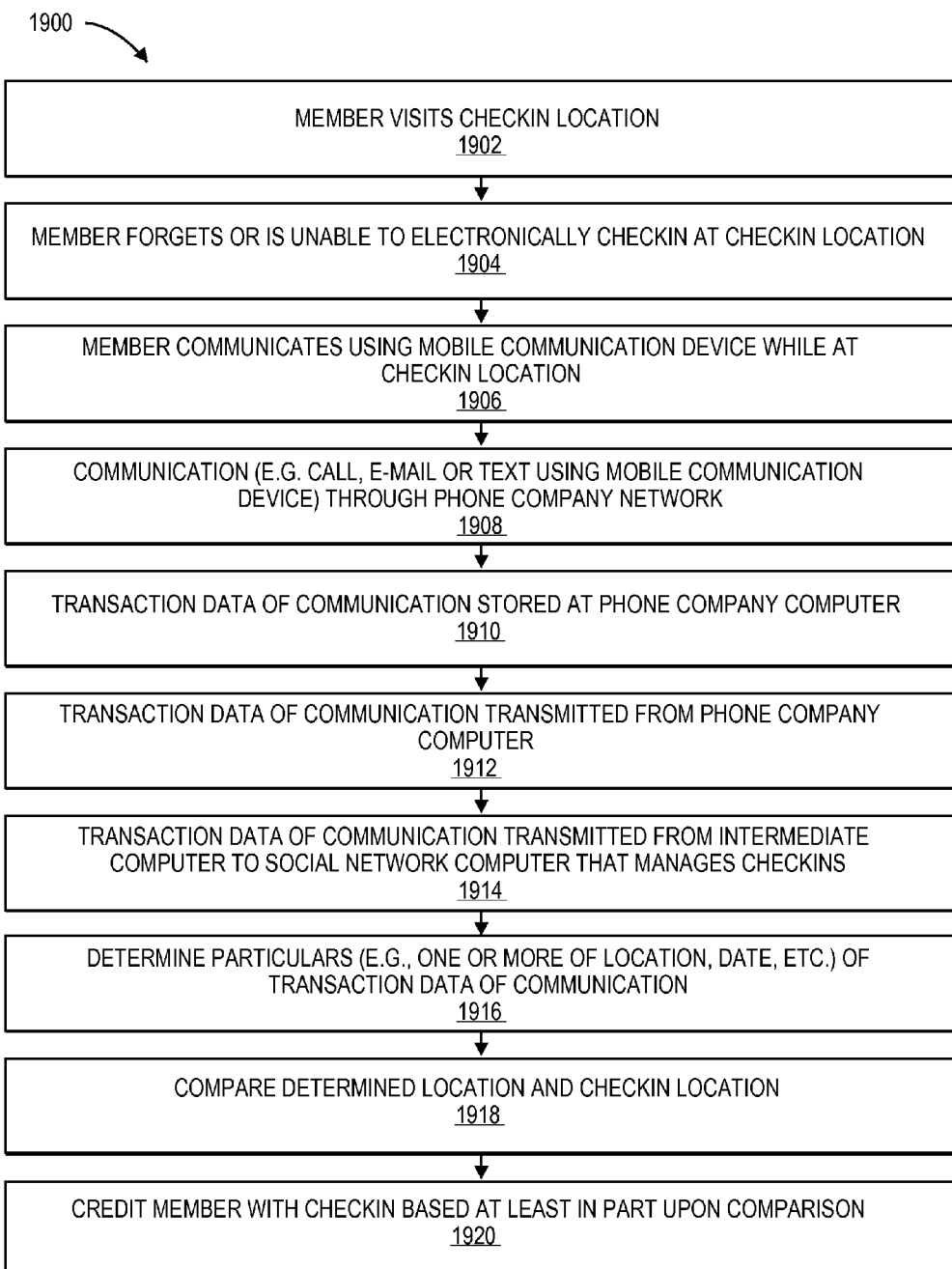
FIG. 19 is a flow diagram of one embodiment of a method for crediting a member with a missed check-in using the system illustrated in FIG. 18.

Referring to FIG. 19, a method 1900 for crediting a member 435 of a social network with a missed location-based electronic check-in comprises using the system 1800 illustrated in FIG. 18 comprises the member 435 visiting the check-in location 450 at 1902 and forgetting or not being able to electronically check-in at that location 450 at step 1904. At step 1906, the member 435 engages in a communication with the mobile communication device 430 (e.g., a call, e-mail or text message sent from the mobile communication device 430). At step 1908, the call, e-mail or text message is connected and completed through the network 440g, and call data 1860 (in embodiments in which a call is made) such as call date, time, number called or contacted, call duration, etc. is stored in a database 1822 of the phone company computer 1820 at step 1910.

At step 1912, communication or call data 1860 is transmitted from the phone company computer 1820 to the intermediate computer 420, at step 1914, communication or call data 1860 is transmitted from the intermediate computer 420 to the social network computer 410. At steps 1916-1920, the social network computer 410 and/or the intermediate computer 420 are utilized to determine the communication data particulars (e.g., one or more of location, date, etc.) from the call data 1860 received from the phone company computer 1820, compare the determined location and a check-in location, and credit the member 435 with the missed check-in if the determined location matches the check-in location, assuming that the check-in is not already credited 455 to ensure that check-in credits are counted once and not duplicated.

Figure 20:
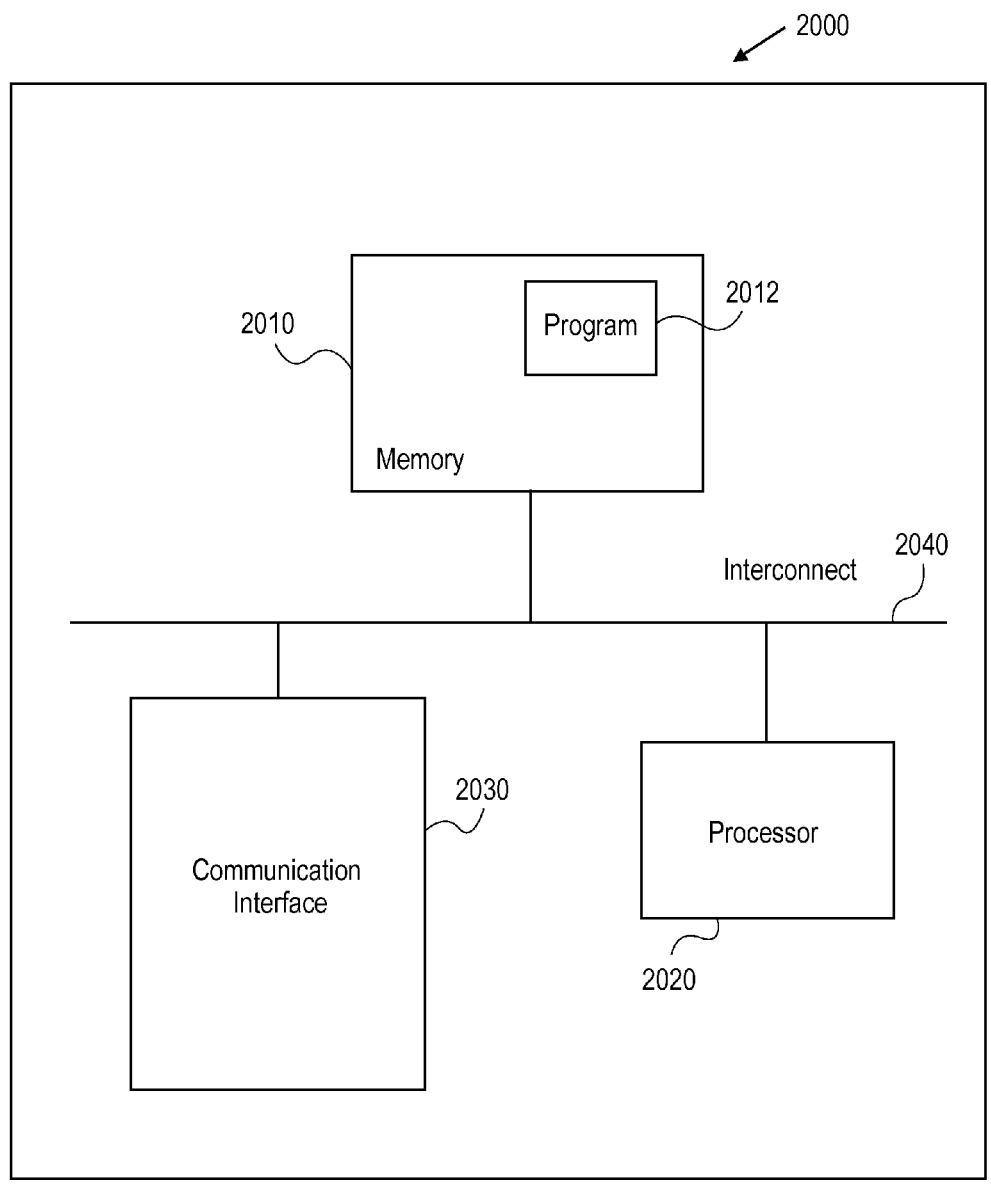
FIG. 20 is a block diagram of components of a computing apparatus or system in which various embodiments may be implemented or that may be utilized to execute various embodiments.

FIG. 20 generally illustrates components of a computing device 2000 that may be utilized to execute embodiments and that includes a memory 2010, account processing program instructions 2012, a processor or controller 2020 to execute account processing program instructions 2012, a network or communications interface 2030, e.g., for communications with a network or interconnect 2040 between such components. The memory 2010 may be or include one or more of cache, RAM, ROM, SRAM, DRAM, RDRAM, EEPROM and other types of volatile or non-volatile memory capable of storing data. The processor unit 2020 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2040 may include a system bus, LDT, PCI, ISA, or other types of buses, and the communications or network interface may, for example, be an Ethernet interface, a Frame Relay interface, or other interface. The network interface 2030 may be configured to enable a system component to communicate with other system components across a network which may be a wireless or various other networks. It should be noted that one or more components of computing device 2000 may be located remotely and accessed via a network. Accordingly, the system configuration provided in FIG. 20 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2020 performs steps or executes program instructions 2012 within memory 2010 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference to a receipt program such as QUICKRECEIPTS personal finance program and other personal finance programs such as QUICKEN, MINT and FINANCEWORKS personal finance programs, embodiments may also be implemented by or using other receipt programs, which may also be desktop or on-line programs.

Further, while certain embodiments are described with reference to a missed location-based electronic check-in of one member of the social network, embodiments may also be applied to multiple members and various numbers of missed check-ins for each member. Thus, transaction data from a merchant payment device, a financial institution and/or a phone company may include one or more of location, date and time data for hundreds and thousands of different members, each of which may purchase goods or services from various merchants at respective check-in locations and/or make calls from various check-in locations. Additionally, in embodiments utilizing transaction data in the form of call data, the member may or may not purchase an item from a merchant at the check-in location, and the call data can be used to determine whether to credit for a missed check-in in both situations.

Moreover, while embodiments are described with reference to determining whether to credit a missed check-in based on a particular type of transaction data, embodiments may involve analysis of multiple types of transaction data (e.g., receipt and bank data, receipt and call data, bank and call data, receipt, bank and call data). Thus, various types of data may be provided by the intermediate computer and be generated by a source other than the social network computer.

Further, electronic receipt data and financial data of an account of a member may involve various types of payment including but not limited to, credit card, debit card, check, electronic check, ATM withdrawal, ACH and other forms of electronic transactions. Receipt data that is sent to the host computer may also be generated as a result of cash purchases, and paper receipts can be scanned and processed for inclusion in the receipt database.

Additionally, while certain embodiments have been described with respect to using transaction data from a third party source other than the social network or from a third party source other than the social network and the member, embodiments may also be used to verify or confirm checkins that have already been credited, i.e., checkins that were not missed. Thus, in these embodiments of the invention, after a member checks in at the location using the mobile communication device and the check-in is processed and credited by the social network computer, the social network computer may receive or access transaction data from the intermediate computer or another source to verify, confirm or cross-check location data of credited checkins and location data of transaction data related to respective credited checkins. Such embodiments may, for example, be helpful to assist in preventing and deterring fraudulent checkins and ensuring that credited check-in are valid.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. Thus, the particular sequence of method steps is not intended to be limiting and is provided for ease of explanation.

For example, a member may forget to electronically check into the check-in location before or after the member engages in an activity that generates transaction data. Further, transaction data can be transmitted from the check-in location to the intermediate computer, financial institution or phone company computer before or after the member leaves a check-in location.

Accordingly, embodiments are intended to exemplify alternatives, modifications, and equivalents that may fall within the scope of the claims.

What is claimed is:

1. A computer-implemented method, comprising:
a first computer of a social network receiving electronic transaction data of a completed transaction resulting from a prior purchase of an item made by a member of the social network from a merchant when the member visited a location of the merchant, wherein the member did not electronically check in at the merchant location with a mobile communication device when the member was at the merchant location, the first computer receiving the electronic transaction data through a first network from a second computer storing respective electronic transaction data of respective purchases of respective items by respective members of the social network from respective merchants;
determining the merchant location from the received electronic transaction data with at least one of the first and second computers;
comparing the determined merchant location and a check-in location of the social network with at least one of the first and second computers; and
identifying the missed electronic check-in based at least in part upon the comparison with at least one of the first and second computers.

2. The method of claim 1, the electronic transaction data comprising the merchant location.

3. The method of claim 2, the second computer comprising a personal finance program that collects respective electronic transaction data of respective completed transactions from a plurality of accounts of the member through respective networks.

4. The method of claim 3, the plurality of accounts comprising at least one account selected from the group consisting of a savings account, a checking account, a money market account, and a credit card account.

5. The method of claim 3, the personal finance program retrieving electronic transaction data from an on-line bank account or an on-line credit card transaction summary.

6. The method of claim 1, the electronic transaction data comprising electronic receipt data.

7. The method of claim 6, the electronic receipt data further comprising a merchant identifier, a transaction date, a transaction amount, an item identifier, and an identification of a form of payment tendered by the member to purchase the item from the merchant.

8. The method of claim 6, the second computer comprising a receipt collection program and being in communication with respective payment devices of respective merchants through respective networks, the receipt collection program being executed to receive respective electronic receipt data for respective prior purchases of respective items made by respective members of the social network and store collected electronic receipt data respective missed electronic check-ins being identified based at least in part upon comparisons involving respective merchant location data of the respective electronic receipt data stored in the database.

9. The method of claim 1, further comprising:
determining whether to credit the member with the missed electronic check-in; and
crediting the member with the missed check-in when the determined merchant location matches the check-in location of the social network.

10. The method of claim 9, wherein the missed electronic check-in is automatically credited to the member.

11. The method of claim 9, further comprising notifying the member of the credit for the missed electronic check-in.

12. The method of claim 11, notifying the member of the credit comprising sending an electronic message from the first computer of the social network to the mobile communication device.

13. The method of claim 11, wherein the first computer of the social network notifies the member of the missed check-in.

14. The method of claim 11, wherein the second computer of the social network notifies the member of the missed check-in.

15. The method of claim 1, wherein the member utilizes the mobile communication device or a third computer in communication with the second computing apparatus through a second network to retrieve electronic transaction data stored at the second computing apparatus, the first computer receiving the retrieved electronic transaction data from the mobile communication device or from the third computer through respective networks.

16. The method of claim 1, wherein the first computer determines the merchant location, compares the determined merchant location and check-in locations of the social network, and identifies the missed electronic check-in.

17. The method of claim 1, wherein the second computer determines the merchant location, compares the determined merchant location and check-in locations of the social network, and identifies the missed electronic check-in.

18. The method of claim 1, wherein the electronic transaction data is transmitted from the second computer to the first computer in response to a request by the member accessing the second computer.

19. The method of claim 1, wherein the electronic transaction data is transmitted from the second computer to the first computer in response to a request by the first computer.

20. The method of claim 1, wherein the electronic transaction data is periodically compared with check-in data of the social network to identify potential check-ins that the member may have missed.

21. The method of claim 1, further comprising granting a mayorship, accolade or honor to the member based at least in part upon a missed electronic check-in that was subsequently credited to the member after the member left the merchant location.

22. The method of claim 1, further comprising granting a reward to the member based at least in part upon the missed electronic check-in that was subsequently credited to the member after the member left the merchant location.

23. The method of claim 1, wherein a program for collecting and storing electronic transaction data executes on the second computer, and the first computer can be accessed through the program.

24. The method of claim 1, wherein the electronic transaction data that is sent to the first computer is selected by the member while accessing the second computer.

25. The method of claim 1, wherein the first computer receives the electronic transaction data, determines the merchant location, compares the determined merchant location and the check-in location, and identifies the missed check-in without knowledge of the member.

26. The method of claim 1, the missed electronic check-in being identified after the member has left and is no longer at the merchant location.

27. The method of claim 9, the missed electronic check-in being credited after the member has left and is no longer at the merchant location.

28. The method of claim 1, the merchant location comprising a building entered by the member.

29. The method of claim 1, the item comprising a good or service.

30. The method of claim 1, further comprising notifying the member of the missed electronic check-in.

\* \* \* \* \*